United States Patent
Skiles et al.

(10) Patent No.: US 12,079,211 B2
(45) Date of Patent: Sep. 3, 2024

(54) NATURAL-LANGUAGE PROCESSING ACROSS MULTIPLE LANGUAGES

(71) Applicant: SparkCognition, Inc., Austin, TX (US)

(72) Inventors: Erik Skiles, Manor, TX (US); Devan Plantamura, Austin, TX (US)

(73) Assignee: SPARKCOGNITION, INC., Austin, TX (US)

( * ) Notice: Subject to any disclaimer, the term of this patent is extended or adjusted under 35 U.S.C. 154(b) by 0 days.

(21) Appl. No.: 17/933,250

(22) Filed: Sep. 19, 2022

(65) Prior Publication Data
US 2023/0096070 A1 Mar. 30, 2023

Related U.S. Application Data

(60) Provisional application No. 63/248,015, filed on Sep. 24, 2021.

(51) Int. Cl.
| | |
|---|---|
| *G06F 7/00* | (2006.01) |
| *G06F 16/2452* | (2019.01) |
| *G06F 40/58* | (2020.01) |
| *G10L 15/22* | (2006.01) |
| *G10L 15/26* | (2006.01) |

(52) U.S. Cl.
CPC ........ *G06F 16/24522* (2019.01); *G06F 40/58* (2020.01); *G10L 15/22* (2013.01); *G10L 15/26* (2013.01)

(58) Field of Classification Search
CPC ........... G06F 16/24522; G06F 16/3337; G06F 16/9024; G06F 16/90332; G06F 16/3334; G06F 16/3344; G06F 40/58; G06F 40/169; G06F 40/295; G06F 40/44; G06F 40/45; G10L 15/22; G10L 15/26
See application file for complete search history.

(56) References Cited

U.S. PATENT DOCUMENTS

| | | | |
|---|---|---|---|
| 8,406,384 B1 * | 3/2013 | Tremblay | H04M 3/51 704/270.1 |
| 2010/0070262 A1 * | 3/2010 | Udupa | G06F 16/3344 704/7 |
| 2010/0070521 A1 * | 3/2010 | Clinchant | G06F 16/3337 707/E17.139 |
| 2018/0295072 A1 * | 10/2018 | Yim | G06F 3/04817 |
| 2022/0414228 A1 * | 12/2022 | Difonzo | G06F 16/24522 |

* cited by examiner

*Primary Examiner* — Mohammad A Sana
(74) *Attorney, Agent, or Firm* — Moore IP Law

(57) ABSTRACT

A method includes obtaining a query in a base language and translating the query to generate one or more translated queries each in a respective target language. The method also includes searching one or more sets of electronic files based on the one or more translated queries to generate target-language search results, where each translated query is used to search one or more electronic files that include content in the respective target language of the translated query. The method also includes, based on the target-language search results, scheduling one or more electronic files of the one or more sets of electronic files for at least partial translation to the base language.

20 Claims, 9 Drawing Sheets

NATURAL-LANGUAGE PROCESSING ACROSS MULTIPLE LANGUAGES

CROSS-REFERENCE TO RELATED APPLICATION

The present application claims priority from U.S. Provisional Application No. 63/248,015 filed Sep. 24, 2021, entitled "NATURAL-LANGUAGE PROCESSING ACROSS MULTIPLE LANGUAGES," which is incorporated by reference herein in its entirety

BACKGROUND

Computers have greatly simplified the process of searching through large quantities of data. Early search efforts generally relied on underlying structure within the data (such as a tabular arrangement of data) and a structured query. Since these early efforts, there have been significant improvements in search techniques such that, by using natural-language processing (NLP) techniques, computers are able to search for related concepts in files that include everyday human language. Some of these NLP techniques have been adapted in ways that facilitate automated translation of documents between two human languages. Such translation techniques are computationally challenging and require significant computing resources.

Many NLP techniques rely on machine learning. Machine learning includes a wide array of techniques, and generally refers to techniques by which a computer "learns" to perform some operation without being provided step-by-step instructions describing the operation. Such machine-learning techniques can be used to generate machine-learning models, which include parameters and/or instructions for performing the operations that the computer "learned" during training. Machine-learning models for natural-language processing can be quite large and may require significant computing resources (e.g., processor cycles and memory) to operate. Further, training such machine-learning models is an even more complex and resource intensive process. As a result, it is often the case that those who need to perform NLP operations (such as natural-language searching), are, for practical reasons, constrained to using general-purpose machine-learning models created by others.

General-purpose machine-learning models can be of limited use in certain circumstances. For example, the meaning of human language is often very context specific. To illustrate, many fields have specialized vocabulary which may not be well represented in training data used to train a general-purpose machine-learning model, resulting in the general-purpose machine-learning model incorrectly processing terms from this specialized vocabulary. Further, some terms from such specialized vocabulary may be repurposed from every day, common usage of the term. Put another way, the same word can have different meanings in common usage than in a specialized field. This aspect of human language can limit the utility of NLP processing and automated NLP translation in some situations.

SUMMARY

Particular implementations of systems and methods to facilitate natural-language processing and data acquisition across multiple languages are disclosed.

According to a particular aspect, a method includes obtaining a query in a base language and translating the query to generate one or more translated queries each in a respective target language. The method also includes searching one or more sets of electronic files based on the one or more translated queries to generate target-language search results, where each translated query is used to search one or more electronic files that include content in the respective target language of the translated query. The method also includes, based on the target-language search results, scheduling one or more electronic files of the one or more sets of electronic files for at least partial translation to the base language.

According to a particular aspect, a device includes one or more processors configured to obtain a query in a base language and to translate the query to generate one or more translated queries each in a respective target language. The one or more processors are also configured to search one or more sets of electronic files based on the one or more translated queries to generate target-language search results, where each translated query is used to search one or more electronic files that include content in the respective target language of the translated query. The one or more processors are further configured to, based on the target-language search results, schedule one or more electronic files of the one or more sets of electronic files for at least partial translation to the base language.

According to a particular aspect, a non-transitory computer-readable medium stores instructions that, when executed by one or more processors, cause the one or more processors to obtain a query in a base language and translate the query to generate one or more translated queries each in a respective target language. The instructions further cause the one or more processors to search one or more sets of electronic files based on the one or more translated queries to generate target-language search results, where each translated query is used to search one or more electronic files that include content in the respective target language of the translated query. The instructions also cause the one or more processors to, based on the target-language search results, schedule one or more electronic files of the one or more sets of electronic files for at least partial translation to the base language.

According to another particular aspect, a method includes obtaining a query in a base language and translating the query to multiple target languages to generate multiple translated queries. The method also includes searching one or more sets of electronic files based on the translated queries to generate target-language search results, where each translated query of the multiple translated queries is used to search one or more electronic files that include content in a target language of the translated query. The method also includes translating at least a portion of an electronic file listed in the target-language search results to the base language to generate a base-language search result. The method also includes generating an output including a base-language search results listing including the base-language search result.

According to a particular aspect, a device includes one or more processors configured to obtain a query in a base language and to translate the query to multiple target languages to generate multiple translated queries. The one or more processors are also configured to search one or more sets of electronic files based on the translated queries to generate target-language search results, where each translated query of the multiple translated queries is used to search one or more electronic files that include content in a target language of the translated query. The one or more processors are further configured to translate at least a portion of an electronic file listed in the target-language search results to the base language to generate a base-language search result. The one or more processors are also configured to generate an output including a base-language search results listing including the base-language search result.

According to a particular aspect, a non-transitory computer-readable medium stores instructions that, when executed by one or more processors, cause the one or more processors to obtain a query in a base language and translate the query to multiple target languages to generate multiple translated queries. The instructions further cause the one or more processors to search one or more sets of electronic files based on the translated queries to generate target-language search results, where each translated query of the multiple translated queries is used to search one or more electronic files that include content in a target language of the translated query. The instructions also cause the one or more processors to translate at least a portion of an electronic file listed in the target-language search results to the base language to generate a base-language search result. The instructions further cause the one or more processors to generate an output including a base-language search results listing including the base-language search result.

According to a particular aspect, a method also includes obtaining a query in a base language and a conceptual tag associated with the query. The method also includes translating the query, based on the conceptual tag, to generate a translated query in a target language, where the conceptual tag is indicative of a context relevant to translation of the query. The method also includes searching a first set of electronic files based on the translated query to generate target-language search results, where the first set of electronic files include content in the target language. The method also includes translating portions of one or more electronic files listed in the target-language search results to the base language to generate a base-language search results listing. The method also includes generating an output including at least a portion of the base-language search results listing.

According to a particular aspect, a device includes one or more processors configured to obtain a query in a base language and a conceptual tag associated with the query. The one or more processors are also configured to translate the query, based on the conceptual tag, to generate a translated query in a target language, where the conceptual tag is indicative of a context relevant to translation of the query. The one or more processors are further configured to search a first set of electronic files based on the translated query to generate target-language search results, where the first set of electronic files include content in the target language. The one or more processors are also configured to translate portions of one or more electronic files listed in the target-language search results to the base language to generate a base-language search results listing and generate an output including at least a portion of the base-language search results listing.

According to a particular aspect, a non-transitory computer-readable medium stores instructions that, when executed by one or more processors, cause the one or more processors to obtain a query in a base language and a conceptual tag associated with the query. The instructions further cause the one or more processors to translate the query, based on the conceptual tag, to generate a translated query in a target language, where the conceptual tag is indicative of a context relevant to translation of the query. The instructions also cause the one or more processors to search a first set of electronic files based on the translated query to generate target-language search results, where the first set of electronic files include content in the target language. The instructions further cause the one or more processors to translate portions of one or more electronic files listed in the target-language search results to the base language to generate a base-language search results listing. The instructions further cause the one or more processors to generate an output including at least a portion of the base-language search results listing.

DETAILED DESCRIPTION

Figure 1:
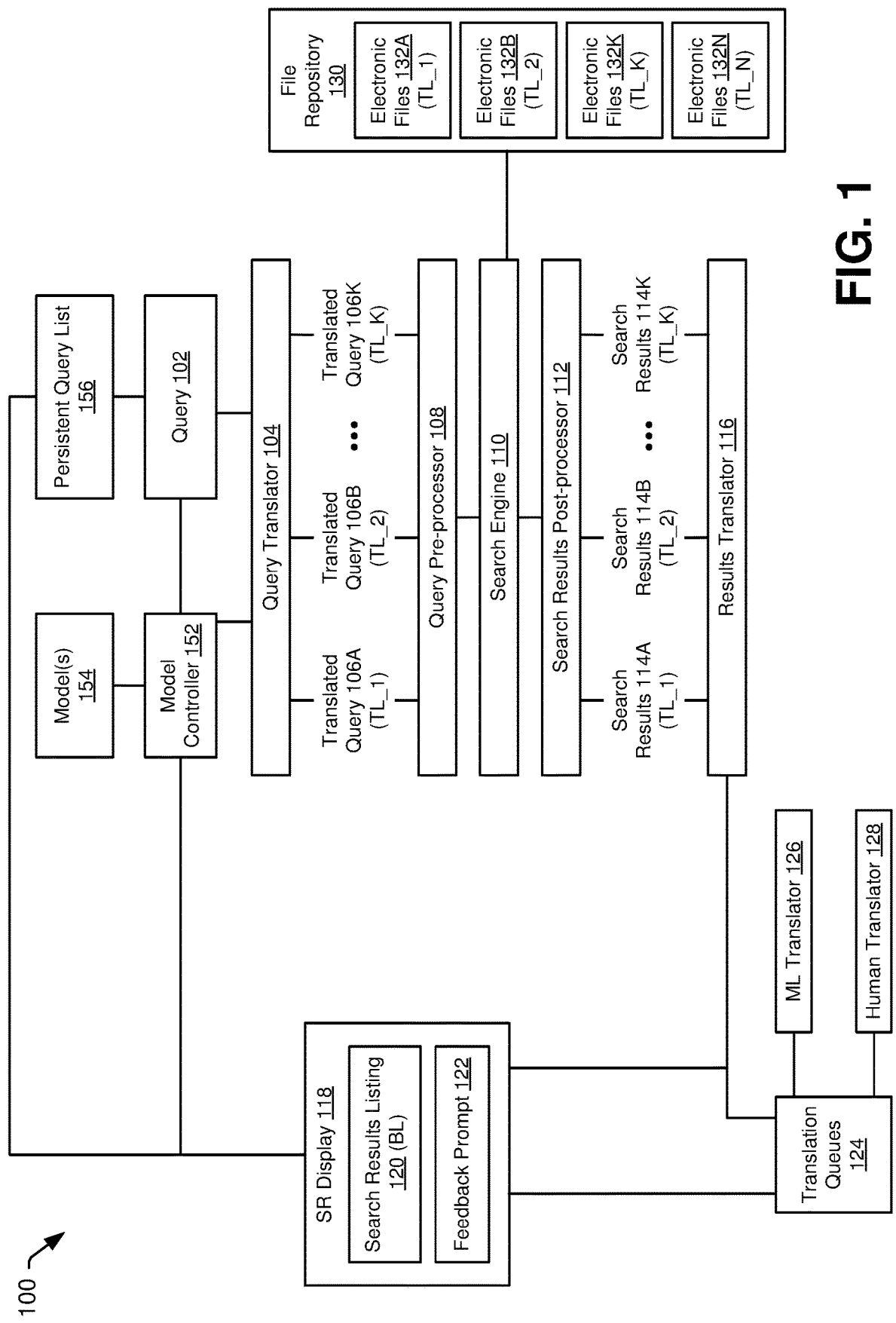
FIG. 1 illustrates a particular example of a system that is operable to facilitate natural-language processing across multiple languages.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, multiple translated queries are illustrated and associated with reference numbers 106A, 106B and 106K. When referring to a particular one of these translated queries, such as the translated query 106A, a distinguishing letter (e.g., "A") is used. However, when referring to any arbitrary one of these translated queries or to these translated queries as a group, the reference number 106 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. For ease of reference herein, such features are generally introduced as "one or more" features and may subsequently be referred to in the singular.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

As used herein, "term" refers to one or more words (e.g., a single word, a phrase, a clause, etc.), one or more abbreviations (e.g., a shortened word, an acronym, an initialism, a contraction, etc.), or a combination thereof. Further, as used herein, "semantic similarity" refers to how similar or related two or more terms are. For example, semantic similarity can be determined or measured based on a distance between two terms in an embedding space. "Semantic dissimilarity" refers to how dissimilar two or more terms are and can be determined or measured based on a distance between the two or more terms in the embedding space.

FIG. 1 illustrates a particular example of a system 100 that is operable to facilitate natural-language processing across multiple languages. The system 100 is illustrated in FIG. 1 as a set of functional blocks. Each of the functional blocks may be realized by any number of hardware and/or software components configured to perform the specified functions. For example, the system 100 may employ various integrated circuit components, e.g., memory elements, processing elements, logic elements, look-up tables, and the like, which may carry out a variety of functions under the control of one or more microprocessors or other control devices. Similarly, each of the software elements of the system 100 may be implemented with any programming or scripting language such as C, C++, C#, Java, JavaScript, VBScript, Macromedia Cold Fusion, COBOL, Microsoft Active Server Pages, assembly, PERL, PHP, AWK, Python, Visual Basic, SQL Stored Procedures, PL/SQL, any UNIX shell script, and extensible markup language (XML) with the various algorithms being implemented with any combination of data structures, objects, processes, routines or other programming elements. Additionally, the system 100 may employ any number of techniques for data transmission, signaling, data processing, network control, and the like.

In the example illustrated in FIG. 1, the system 100 includes a query translator 104. The query translator 104 is configured to receive a query 102 in a base language and translate the query 102 into a target language to form a translated query 106 in the target language. As used herein, a "base language" (abbreviated "BL" herein) refers to a human language (e.g., a spoken or written language) of the query 102, and a "target language" (abbreviated "TL" herein) refers to a different human language, such as the language into which the query 102 is translated or a language present in an electronic file.

The target language(s) may be specified by a user (e.g., via one or more user configurable query parameters). As an example, the target language(s) for a particular query 102 may be specified by a data acquisition requirement that includes the query 102 (and perhaps other queries of a persistent query list 156) indicating information sought and parameters indicating characteristics of electronic files that are to be searched. In this example, the parameters indicating characteristics of electronic files that are to be searched may indicate, for example and without limitation, a geographic or political region from which the electronic file was received, a date associated with the electronic file, a language of the electronic file, a file type of the electronic file, etc. In some implementations, the target language can be determined automatically. For example, if the query 102 specifies that particular electronic files are to be searched, the target language may be selected based on a language present in the particular electronic files.

According to a particular aspect, the query translator 104 is configured to translate the query 102 to multiple target languages to generate a translated query 106 in each of the target languages. To illustrate, in the example shown in FIG. 1, the query translator 104 translates the query 102 into a translated query 106A in a first target language ("TL_1"), a translated query 106B in a second target language ("TL_2"), and a translated query 106K in a Kth target language ("TL_K"), where K is an integer greater than 2. Although three translated queries 106 are illustrated in FIG. 1, in other examples, the query translator 104 is configured to generate more than three or fewer than three translated queries 106.

In a particular aspect, the query translator 104 uses one or more machine translation models (such as neural machine translation models, statistical translation models, or both) including general-purpose translation models and may also include context-specific or specialty translation models. The general-purpose translation models may be trained using, for example, large, publicly available multi-language document corpuses, such as Wikipedia, United Nations documents, translated books and movies, etc. The context-specific translation models may be trained using multi-language document corpuses that are geographically specific (e.g., to capture linguistic differences associated with regional dialects), topically specific (e.g., to capture linguistic differences and/or special vocabulary associated with particular topics, such as computer science or particle physics), temporally specific (e.g., to capture linguistic differences over time), etc. In some aspects, the query translator 104 is configured to translate groups of words of a natural language query (e.g., the query 102) to capture context-specific aspects (e.g., how each word relates to other words in the query 102). In some aspects, the query translator 104 also, or alternatively, uses context-specific (e.g., associated with a particular geographical region, a particular topic, a particular time, etc.) dictionaries to facilitate translation of the query 102.

In the example illustrated in FIG. 1, the system 100 includes a query pre-processor 108. The query pre-processor 108 is configured to modify a translated query 106 to facilitate searching a file repository 130. For example, the query pre-processor 108 may perform query expansion operations, query limiting operations, query structuring operations, etc. As one example of query expansion, the query pre-processor 108 may add to a translated query 106 one or more terms that, in the target language and specific context of the translated query 106, are synonyms for a term in the translated query 106. The query pre-processor 108 may use context-specific dictionaries or synonym lists to select terms to be added to the translated query 106. Additionally, or alternatively, the query pre-processor 108 may use one or more machine learning models (e.g., models 154) to perform query expansion. As described further below, the models 154 may be context-specific, user-specific, or both. As one example of query limitation, the query pre-processor 108 may add exclusion terms to a translated query 106. An exclusion term refers to a word or phrase that should not be present in an electronic file selected as a match for the translated query 106 or should not be present in a phrase selected as a match for the translated query 106. As one example of query structuring, the query pre-processor 108 may generate a structured query (e.g., a Structured Query Language (SQL) query based on a natural language query). In this example, some electronic files 132 of the file repository 130 may be stored in a format (such as database tables) that is suitable for structured query searching, and the query pre-processor 108 may modify the translated query 106 to enable faster and/or more efficient (in terms of computing resources used) and/or more accurate (e.g., fewer false positive matches, fewer false negative matches, etc.) searching of the electronic files 132.

The system 100 of FIG. 1 includes a search engine 110 that is configured to search for electronic files 132 (or portions thereof) that match one of the translated queries 106. In this context, an electronic file 132 "matches" a translated query 106 when the electronic file 132 includes features specified by the translated query 106, such as specified terms (in any order or arrangement or in an order or arrangement indicated by the translated query 106) or specified metadata (e.g., a creation date of the electronic file 132, a modification date of the electronic file 132, a source of the electronic file 132, a conceptual tag of the electronic file 132, etc.). Additionally, or alternatively, an electronic file 132 "matches" a translated query 106 when content of the electronic file 132 is semantically similar to content of the translated query 106, where semantic similarity is determined based on proximity of terms in a target-language specific features space. In some implementations, "matching" may also indicate that the electronic file 132 excludes certain features specified by the translated query 106, such as specified exclusion terms or specified exclusion metadata. In some implementations, the search engine 110 searches an index or other representation of the electronic files 132 rather than searching the electronic files 132 directly. For example, the file repository 130 may include a search index including data representing each electronic file 132 in the file repository 130, and the search engine 110 may search the search index.

In a particular implementation, rather than use each translated query 106 to search the entire file repository 130, a particular translated query 106 is used to search only those electronic files 132 of the file repository 103 that include content in the target language of the translated query 106. For example, in FIG. 1, the file repository 130 includes electronic files 132A in the target language TL_1, electronic files 132B in the target language TL_2, electronic files 132K in the target language TL_K, and electronic files 132N in the target language TL_N. In this example, the translated query 106A (in the target language TL_1) is only used to search the electronic files 132A, which is faster and uses fewer computing resources than searching all of the electronic files 132 of the file repository 130. Additionally, the same arrangement of letters or symbols can be used to represent different words in different languages, thus limiting a search to electronic files 132 that include content in a specific language can reduce false positive matches.

In the example illustrated in FIG. 1, the search engine 110 is configured to provide search results (e.g., search results 114A in target language TL_1, search results 114B in target language TL_2, and search results 114A in target language TL_K) to a search results post-processor 112. The search results post-processor 112 may perform search post-processing operations such as assigning priorities to the search results to facilitate ordering or collating search results in different target languages. For example, in FIG. 1, the search engine 110 generates a first set of search results (e.g., search results 114A) associated with a first target language (e.g., TL_1), a second set of search results (e.g., search results 114B) associated with a second target language (e.g., TL_2), and a Kth set of search results (e.g., search results 114K) associated with a Kth target language (e.g., TL_K). The search engine 110 generates the search results 114A separately (e.g., using different translated search queries 106 and/or searching different electronic files 132) from the search results 114B and separately from the search results 114K. Accordingly, in some implementations, the search engine 110 prioritizes (e.g., arranges in order of expected pertinence) results in search results 114A relative to one another, prioritizes results in search results 114B relative to one another, and prioritizes results in search results 114K relative to one another, but does not prioritize results of different search results 114A, 114B, and 114K relative to one another. In such implementations, the search results post-processor 112 assigns priority data to indicate an order of expected pertinence of results across the various the search results 114A, 114B, 114K. For example, the search results post-processor 112 prioritizes the results in search results 114A relative to results in the search results 114B and results in the search results 114K.

Additionally, or alternatively, the search results post-processor 112 determines a search result snippet for each of one or more of the search results 114. A "snippet" refers to a portion of an electronic file 132 that indicates the context, within the electronic file 132, in which one or more terms that match a translated query 106 are found. For example, when a term that matches a search term from the translated query 106 is found in a particular electronic file 132, a paragraph of the particular electronic file that includes the term may be used as a search result snippet. Using a paragraph as a search results snippet is only one example. In other examples, other techniques are used to select search results snippets.

In the example illustrated in FIG. 1, the search results 114 are also provided to a results translator 116. In FIG. 1, the search results post-processor 112 provides the search results 114 to the results translator 116; however, in other implementations, the results translator 116 receives the search results 114 from the search engine 110.

The results translator 116 is configured to translate at least a portion of the search results 114 (which may include the search results snippets determined by the search results post-processor 112) from their respective target languages to the base language. In some implementations, the results translator 116 operates in the same manner as the query translator 104. For example, the same code and/or machine-learning model may be used as the query translator 104 and the results translator 116. However, in some implementations, different code and/or machine-learning models are used for the query translator 104 than for the results translator 116. For example, generally the query 102 includes a smaller text segment, with less context than may be included in a search result snippet. As such, the query translator 104 may be less complex than the results translator 116.

In the example illustrated in FIG. 1, output of the results translator 116 (e.g., at least portions of the search results 114 in the base language) may be collated (based on priority data assigned by the search engine 110 or the search results post-processor 112) and provided to a search results (SR) display 118. For example, the search results display 118 in FIG. 1 includes a search results listing 120 in the base language. The search results listing 120 includes a prioritized list of search results snippets, and each search results snippet includes a portion of an electronic file 132 translated from a target language of the electronic file 132 to the base language.

The search results display 118 may also include one or more feedback prompts 122, such as a respective feedback prompt for each search result of the search results listing 120. The feedback prompts 122 enable a user to provide feedback indicating a level of pertinence of each of base-language search results snippet of the search results listing 120. The system 100 may use user input indicating the level of pertinence of a base-language search result for various purposes.

As an example, if the user input indicates that a particular base-language search result has a first level of pertinence (e.g., is highly pertinent), one or more translation queues 124 may be modified to schedule translation to the base language of an electronic file 132 (or a portion thereof) associated with the search result. The translation queue(s) 124 may include one or more queues of translation tasks for a human translator 128 (e.g., a speaker of one of the target languages), one or more queues of translation tasks for a machine-learning (ML) translator 126, or both. In some implementations, if the electronic file 132 associated with the search result is already scheduled for translation, the translation queues 124 may be modified, based on the user input, to change the type of translation that is scheduled (e.g., to schedule machine-learning translation rather than human translation, or vice versa), or to increase or decrease a priority of the electronic file 132 in the translation queues 124. In some implementations, if the electronic file 132 associated with the search result is already scheduled for translation, the translation queues 124 may be modified, based on the user input (e.g., indicating low or no pertinence), to remove the electronic file 132 from the translation queues 124.

As another example, the user input indicating the level of pertinence may be used to determine whether to modify one or more of the translated queries 106. To illustrate, if the search results having the highest expected pertinence or priority (as indicated by the search engine 110 and/or the search results post-processor 112) for a particular target language are completely irrelevant (as indicated by the user input) while search results for one or more other target languages are relevant, this can be an indication that query 102 was not well translated to form the translated query 106 of the particular target language. In this circumstance, the translated query 106 of the particular target language may be retranslated (e.g., using a different machine translation technique or by a human translator 128) and the search can be repeated.

As another example, the user input indicating the level of pertinence may be used to generate or update a machine-learning model 154. In this example, the machine-learning model 154 may be used, during a subsequent search operation to determine semantic similarity in the target language, to filter search results 114, to expand a search query, or a combination thereof. In a particular aspect, the query pre-processor 108 may use the model 154 to expand one or more of the translated queries 106. In another particular aspect, the search engine 110 may use the model 154 to limit (e.g., filter) the set of electronic files 132 that are searched. To illustrate, the model 154 may be used to assign label data (e.g., conceptual tags) to one or more electronic files 132 or to portions of the one or more electronic files 132, and the label data may be used to select electronic files 132 to be searched. In another particular aspect, the search results post-processor 112 may use the model 154 to remove particular search results 114 from the search results listing 120 or to determine a display order of the search results 114 from the search results listing 120. Aspects of training or updating the model 154 are described below.

As still another example, the user input indicating the level of pertinence or other user input may cause the system 100 to save the query 102, one or more of the translated queries 106, or both, to a persistent query list 156. A query stored in the persistent query list 156 may be used to automatically (e.g., periodically, occasionally, or in response to detection of specified conditions) search one or more additional electronic files 132 that become available after the query is stored in the persistent query list 156. To illustrate, if the translated query 106A generated particularly pertinent search results 114, the user may store the translated query 106A to the persistent query list 156 to limit the risk that changes to the query translator 104 may result in minor translation differences that reduce the efficacy of a search based on the translated query 106A.

The system 100 of FIG. 1 also includes a model controller 152. The model controller 152 is configured to control generation, updating, and/or use of the models 154. The models 154 include one or more machine-learning models configured to process electronic files (e.g., the electronic files 132 in the file repository 130 or electronic files that are to be added to the file repository 130 or otherwise ingested for access by the search engine 110).

As used herein, the term "machine learning" should be understood to have any of its usual and customary meanings within the fields of computer science and data science, such meanings including, for example, processes or techniques by which one or more computers can learn to perform some operation or function without being explicitly programmed to do so. As a typical example, machine learning can be used to enable one or more computers to analyze data to identify patterns in data and generate a result based on the analysis. For certain types of machine learning, the results that are generated include data that indicates an underlying structure or pattern of the data itself. Such techniques, for example, include so called "clustering" techniques, which identify clusters (e.g., groupings of data elements of the data).

For certain types of machine learning, the results that are generated include a data model (also referred to as a "machine-learning model" or simply a "model"). Typically, a model is generated using a first data set to facilitate analysis of a second data set. For example, a first portion of a large body of data may be used to generate a model that can be used to analyze the remaining portion of the large body of data. As another example, a set of historical data can be used to generate a model that can be used to analyze future data.

Since a model can be used to evaluate a set of data that is distinct from the data used to generate the model, the model can be viewed as a type of software (e.g., instructions, parameters, or both) that is automatically generated by the computer(s) during the machine learning process. As such, the model can be portable (e.g., can be generated at a first computer, and subsequently moved to a second computer for further training, for use, or both). Additionally, a model can be used in combination with one or more other models to perform a desired analysis. To illustrate, first data can be provided as input to a first model to generate first model output data, which can be provided (alone, with the first data, or with other data) as input to a second model to generate second model output data indicating a result of a desired analysis. Depending on the analysis and data involved, different combinations of models may be used to generate such results. In some examples, multiple models may provide model output that is input to a single model. In some examples, a single model provides model output to multiple models as input.

Examples of machine-learning models include, without limitation, perceptrons, neural networks, support vector machines, regression models, decision trees, Bayesian models, Boltzmann machines, adaptive neuro-fuzzy inference systems, as well as combinations, ensembles and variants of these and other types of models. Variants of neural networks include, for example and without limitation, prototypical networks, autoencoders, transformers, self-attention networks, convolutional neural networks, deep neural networks, deep belief networks, etc. Variants of decision trees include, for example and without limitation, random forests, boosted decision trees, etc.

Since machine-learning models are generated by computer(s) based on input data, machine-learning models can be discussed in terms of at least two distinct time windows—a creation/training phase and a runtime phase. During the creation/training phase, a model is created, trained, adapted, validated, or otherwise configured by the computer based on the input data (which in the creation/training phase, is generally referred to as "training data"). Note that the trained model corresponds to software that has been generated and/or refined during the creation/training phase to perform particular operations, such as classification, prediction, encoding, or other data analysis or data synthesis operations. During the runtime phase (or "inference" phase), the model is used to analyze input data to generate model output. The content of the model output depends on the type of model. For example, a model can be trained to perform classification tasks or regression tasks, as non-limiting examples. In some implementations, a model may be continuously, periodically, or occasionally updated, in which case training time and runtime may be interleaved or one version of the model can be used for inference while a copy is updated, after which the updated copy may be deployed for inference.

In some implementations, a previously generated model is trained (or re-trained) using a machine-learning technique. In this context, "training" refers to adapting the model or parameters of the model to a particular data set. Unless otherwise clear from the specific context, the term "training" as used herein includes "re-training" or refining a model for a specific data set. For example, training may include so-called "transfer learning." As described further below, in transfer learning a base model may be trained using a generic or typical data set, and the base model may be subsequently refined (e.g., re-trained or further trained) using a more specific data set.

A data set used during training is referred to as a "training data set" or simply "training data". The data set may be labeled or unlabeled. "Labeled data" refers to data that has been assigned a categorical label indicating a group or category with which the data is associated, and "unlabeled data" refers to data that is not labeled. Typically, "supervised machine-learning processes" use labeled data to train a machine-learning model, and "unsupervised machine-learning processes" use unlabeled data to train a machine-learning model; however, it should be understood that a label associated with data is itself merely another data element that can be used in any appropriate machine-learning process. To illustrate, many clustering operations can operate using unlabeled data; however, such a clustering operation can use labeled data by ignoring labels assigned to data or by treating the labels the same as other data elements.

Machine-learning models can be initialized from scratch (e.g., by a user, such as a data scientist) or using a guided process (e.g., using a template or previously built model). Initializing the model includes specifying parameters and hyperparameters of the model. "Hyperparameters" are characteristics of a model that are not modified during training, and "parameters" of the model are characteristics of the model that are modified during training. The term "hyperparameters" may also be used to refer to parameters of the training process itself, such as a learning rate of the training process. In some examples, the hyperparameters of the model are specified based on the task the model is being created for, such as the type of data the model is to use, the goal of the model (e.g., classification, regression, anomaly detection), etc. The hyperparameters may also be specified based on other design goals associated with the model, such as a memory footprint limit, where and when the model is to be used, etc.

Model type and model architecture of a model illustrate a distinction between model generation and model training.

The model type of a model, the model architecture of the model, or both, can be specified by a user or can be automatically determined by a computing device. However, neither the model type nor the model architecture of a particular model is changed during training of the particular model. Thus, the model type and model architecture are hyperparameters of the model and specifying the model type and model architecture is an aspect of model generation (rather than an aspect of model training). In this context, a "model type" refers to the specific type or sub-type of the machine-learning model. As noted above, examples of machine-learning model types include, without limitation, perceptrons, neural networks, support vector machines, regression models, decision trees, Bayesian models, Boltzmann machines, adaptive neuro-fuzzy inference systems, as well as combinations, ensembles and variants of these and other types of models. In this context, "model architecture" (or simply "architecture") refers to the number and arrangement of model components, such as nodes or layers, of a model, and which model components provide data to or receive data from other model components. As a non-limiting example, the architecture of a neural network may be specified in terms of nodes and links. To illustrate, a neural network architecture may specify the number of nodes in an input layer of the neural network, the number of hidden layers of the neural network, the number of nodes in each hidden layer, the number of nodes of an output layer, and which nodes are connected to other nodes (e.g., to provide input or receive output). As another non-limiting example, the architecture of a neural network may be specified in terms of layers. To illustrate, the neural network architecture may specify the number and arrangement of specific types of functional layers, such as long-short-term memory (LSTM) layers, fully connected (FC) layers, convolution layers, self-attention layers, etc. While the architecture of a neural network implicitly or explicitly describes links between nodes or layers, the architecture does not specify link weights. Rather, link weights are parameters of a model (rather than hyperparameters of the model) and are modified during training of the model.

In many implementations, a data scientist selects the model type before training begins. However, in some implementations, a user may specify one or more goals (e.g., classification or regression), and automated tools may select one or more model types that are compatible with the specified goal(s). In such implementations, more than one model type may be selected, and one or more models of each selected model type can be generated and trained. A best performing model (based on specified criteria) can be selected from among the models representing the various model types. Note that in this process, no particular model type is specified in advance by the user, yet the models are trained according to their respective model types. Thus, the model type of any particular model does not change during training.

Similarly, in some implementations, the model architecture is specified in advance (e.g., by a data scientist); whereas in other implementations, a process that both generates and trains a model is used. Generating (or generating and training) the model using one or more machine-learning techniques is referred to herein as "automated model building". In one example of automated model building, an initial set of candidate models is selected or generated, and then one or more of the candidate models are trained and evaluated. In some implementations, after one or more rounds of changing hyperparameters and/or parameters of the candidate model(s), one or more of the candidate models may be selected for deployment (e.g., for use in a runtime phase).

Certain aspects of an automated model building process may be defined in advance (e.g., based on user settings, default values, or heuristic analysis of a training data set) and other aspects of the automated model building process may be determined using a randomized process. For example, the architectures of one or more models of the initial set of models can be determined randomly within predefined limits. As another example, a termination condition may be specified by the user or based on configurations settings. The termination condition indicates when the automated model building process should stop. To illustrate, a termination condition may indicate a maximum number of iterations of the automated model building process, in which case the automated model building process stops when an iteration counter reaches a specified value. As another illustrative example, a termination condition may indicate that the automated model building process should stop when a reliability metric associated with a particular model satisfies a threshold. As yet another illustrative example, a termination condition may indicate that the automated model building process should stop if a metric that indicates improvement of one or more models over time (e.g., between iterations) satisfies a threshold. In some implementations, multiple termination conditions, such as an iteration count condition, a time limit condition, and a rate of improvement condition can be specified, and the automated model building process can stop when one or more of these conditions is satisfied.

Another example of training a previously generated model is transfer learning. "Transfer learning" refers to initializing a model for a particular data set using a model that was trained using a different data set. For example, a general-purpose natural-language processing model can be trained using a large selection of natural-language text in one or more target languages. In this example, the general-purpose natural-language processing model can be used as a starting point to train one or more models for specific natural-language processing tasks, such as translation between two languages, question answering, or classifying the subject matter of documents. Often, transfer learning can converge to a useful model more quickly than building and training the model from scratch.

Training a model based on a training data set generally involves changing parameters of the model with a goal of causing the output of the model to have particular characteristics based on data input to the model. To distinguish from model generation operations, model training may be referred to herein as optimization or optimization training. In this context, "optimization" refers to improving a metric, and does not mean finding an ideal (e.g., global maximum or global minimum) value of the metric. Examples of optimization trainers include, without limitation, backpropagation trainers, derivative free optimizers (DFOs), and extreme learning machines (ELMs). As one example of training a model, during supervised training of a neural network, an input data sample is associated with a label. When the input data sample is provided to the model, the model generates output data, which is compared to the label associated with the input data sample to generate an error value. Parameters of the model are modified in an attempt to reduce (e.g., optimize) the error value.

As another example, to use supervised training to train a model to perform a classification task, each data element of a training data set may be labeled to indicate a category or categories to which the data element belongs. In this example, during the creation/training phase, data elements are input to the model being trained, and the model generates output indicating categories to which the model assigns the data elements. The category labels associated with the data elements are compared to the categories assigned by the model. The computer modifies the model until the model accurately and reliably (e.g., within some specified criteria) assigns the correct labels to the data elements. In this example, the model can subsequently be used (in a runtime phase) to receive unknown (e.g., unlabeled) data elements, and assign labels to the unknown data elements. In an unsupervised training scenario, the labels may be omitted. During the creation/training phase, model parameters may be tuned by the training algorithm in use such that the during the runtime phase, the model is configured to determine which of multiple unlabeled "clusters" an input data sample is most likely to belong to.

In some aspects, the output of a model can be subjected to further analysis operations to generate a desired result. To illustrate, in response to particular input data, a classification model (e.g., a model trained to perform classification tasks) may generate output including an array of classification scores, such as one score per classification category that the model is trained to assign. Each score is indicative of a likelihood (based on the model's analysis) that the particular input data should be assigned to the respective category. In this illustrative example, the output of the model may be subjected to a softmax operation to convert the output to a probability distribution indicating, for each category label, a probability that the input data should be assigned the corresponding label. In some implementations, the probability distribution may be further processed to generate a one-hot encoded array. In other examples, other operations that retain one or more category labels and a likelihood value associated with each of the one or more category labels can be used.

In some implementations, one or more of the models 154 are trained as text classifiers. In such implementations, the text classifier may be configured to evaluate and/or label an electronic file or a portion of the electronic file. Labels assigned by the text classifier may include conceptual labels (indicating whether the electronic file or portion thereof includes information related to a particular concept), intent labels (indicating an inferred intent or tone of the electronic document or portion thereof), or both. The model controller 152 may train or update the models 154 based on labels assigned by users of the system 100. For example, a user may read one or more documents of a document corpus (e.g., one or more of the electronic files 132 of the file repository 130, or other documents) and assign labels to the document(s) or portions thereof (e.g., terms of interest, sentences, paragraphs, or sets of paragraphs). As another example, after performing a search, the user can review the search results listing 120 and provide labels in response to the feedback prompts 122 associated with the search results listing 120. The user assigned labels and the document(s) may be used together as labeled training data to train or update one or more of the models 154. A model 154 trained or updated in this manner may be used to assign labels to other electronic files 132 in the file repository 130 to improve future search operations. Additionally, or alternatively, the model 154 trained or updated in this manner may be used to assign labels to electronic files that are being added to the file repository 130 (e.g., newly ingested files).

In a particular example, a model 154 trained by the system 100 may be portable, e.g., useable independent of other components of the system 100. In this example, the model 154 may have relatively small computing resource requirements such that the model 154 can be used by a mobile or portable computing device (such as a smartphone, tablet computer, or laptop computer). In this example, multiple instances (e.g., copies) of the model 154 can be provided to users tasked with remote file collection. In this example, a remote file collection user can use the model 154 to quickly determine whether a particular document or file should be collected for further processing. To illustrate, a remote file collection user such as a soldier or investigator at a remote location (e.g., remote from other components of the system 100) can use a smart phone application to scan a document and evaluate content of the document via the model 154. In this illustrative example, the smart phone application can notify the remote file collection user whether the document should be retained for further analysis, discarded, or some other action should be taken.

As one specific example, the remote file collection user need not be able to read the document and need not know what specific features lead to collection and retention of a document. Additionally, the smart phone application can evaluate the document using more than one model, and the models may target different data acquisition requirements. For example, an application used by a soldier in the field can include multiple models based on data acquisition requirements from an intelligence organization. In this example, the soldier may be ignorant of the content or target of each data acquisition requirement, and the models themselves may be present on the smart phone merely as executable computer code, which reveals little if anything about the underlying data acquisition requirements. As such, there is no risk that the soldier or the smart phone will intentionally or accidentally reveal to others what information is being sought. Additionally, the soldier need not be trained in the local language or languages in which the documents or files are likely to be found. A similar smart phone application may be used in other circumstances, such as an initial screening tool for document analysis during discovery as part of a lawsuit.

The system 100 also enables prioritized translation of the electronic files 132. Both human translation and machine translation are resource intensive. To illustrate, significant computing resources (e.g., processor time and power) may be required to generate a machine translation of a large electronic file. Further, for many situations, the original file and the translated file may both be retained, which generally means that translating a file from one language to another approximately doubles the memory footprint used to store copies of the file. The system 100 enables "lazy translation" in which only a subset of the electronic files 132 of the file repository 130 are translated from their respective target languages to the base language. Additionally, or alternatively, different electronic files 132 of the file repository 130 can be allocated different translation resources or schedules. To illustrate, the electronic files 132 that are expected to be most useful can be translated before electronic files 132 that are expected to be less useful. As another illustration, the electronic files 132 that are expected to be most useful can be assigned to higher quality translation resources (which may tend to use more computing time, subject matter expertise, memory, etc.) and electronic files 132 that are expected to be less useful can be assigned to lower quality translation resources. In a particular aspect, only portions (e.g., one or more paragraphs) of a first set of electronic files included in the search results may be translated for search results snippets, and larger portions (e.g., a page or entire document of) a first subset of the first set that have the highest (e.g., top 5) priority or pertinence may be scheduled for translation.

Additionally, by training or updating the models 154 based on provided search results 114, the search results 114 provided by the system 100 improve over time. For example, user input provided in response to the feedback prompt 122 can be used to generate labeled training data to update or train a model 154, to revise a translated query, or for another purpose to update the system 100 to generate increasingly pertinent results.

In some implementations, the various components and features of the system 100 are distributed across two or more processors or two or more computing devices. For example, the search engine 110 may correspond to or include instructions that are executable by one or more processors of a server or cloud-based computer that is remote from a computer that outputs the search results display 118. Additionally, or alternatively, the model controller 152 may correspond to or include instructions that are executable by one or more processors of a computer that is remote from a computer that outputs the search results display 118, remote from a computer that executes the search engine 110, or both. Likewise, each of the query translator 104, the query pre-processor 108, the search results post-processor 112, the results translator 116 may include or correspond to instructions that are executable by the same computer or processor as one or more of the other components of the system 100 or by one or more computers or processors that are remote from the other components of the system 100. Further, the models 154, the persistent query list 156, the file repository 130, and the translation queues 124 may include or correspond to data stored at one or more memory devices of a computer or server, or one or more of the models 154, the persistent query list 156, the file repository 130, or the translation queues 124 may be stored remotely from at least some of other data used by the system 100.

Figure 2:
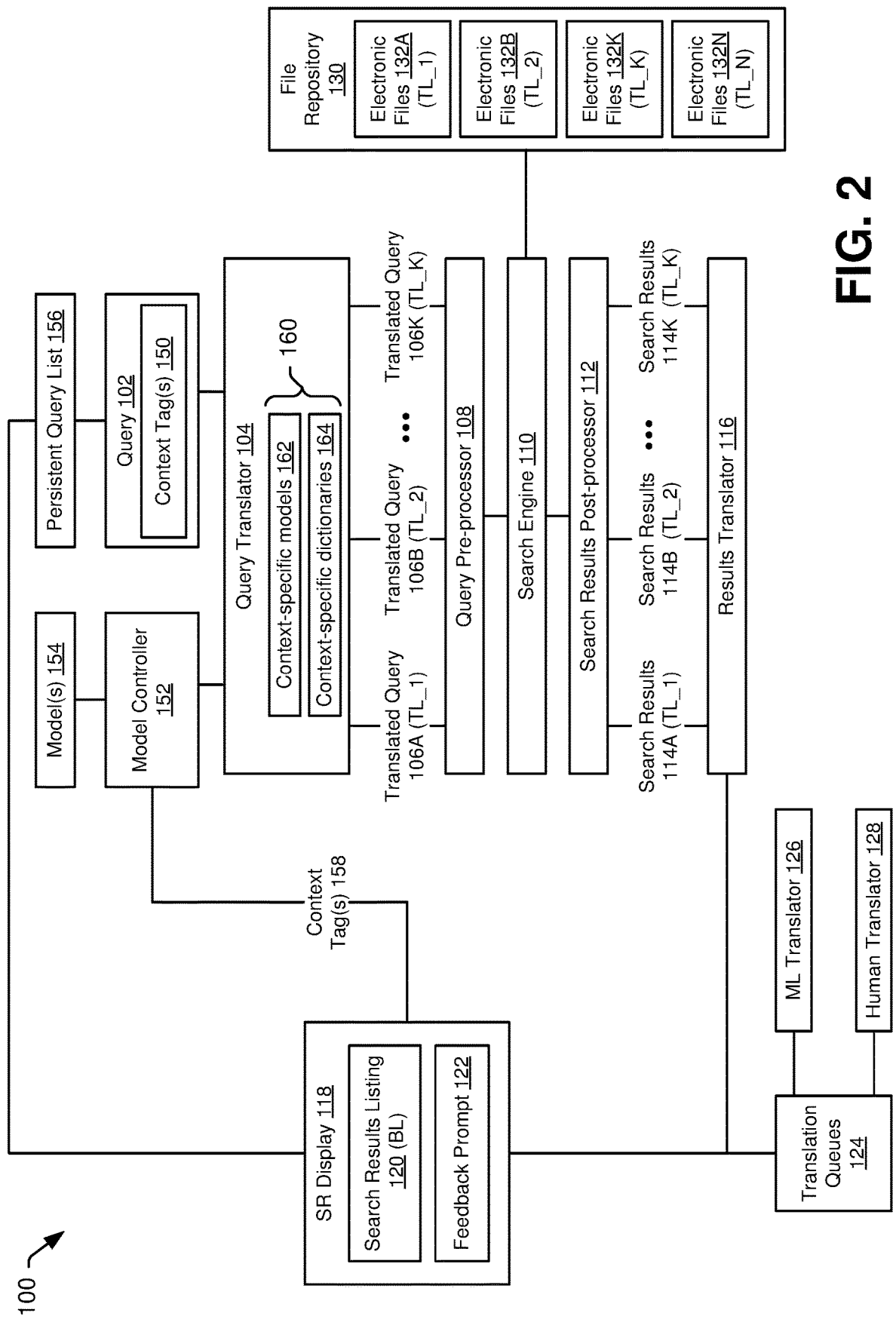
FIG. 2 illustrates another example of a system that is operable to facilitate natural-language processing across multiple languages.

FIG. 2 illustrates another example of the system 100 of FIG. 1. In the example illustrated in FIG. 2, the query translator 104 includes or has access to one or more context-specific subsystems 160, such as one or more context-specific models 162, one or more context-specific dictionaries 164, or both. The system 100 of FIG. 2 also includes other features and components described above with reference to FIG. 1.

The query translator 104 of FIG. 2 may be configured to select one or more of the context-specific subsystems 160 (e.g., one or more of the context-specific models 162, one or more of the context-specific dictionaries 164, or both) based on a context tag(s) 150 associated with the query 102. As used herein, "context tags" include conceptual tags, intent tags, or both.

Each context-specific subsystem 160 is, for example, associated with a specific geographic region (e.g., an area where particular slang or a particular dialect is prevalent), associated with a specific topic (e.g., computer science, mechanical engineering, meteorology, etc.), associated with a specific time period (e.g., a pre-Internet timeframe, a period pre-dating or post-dating a specific linguistic change, such as the introduction of a new use of a specific term), associated with another contextual linguistic indicator, or a combination thereof.

In the example illustrated in FIG. 2, the query translator 104 may be configured to use a general-purpose translation subsystem (e.g., a general-purpose linguistic model) when no context tags 150 are associated with the query 102 and to use a context-specific subsystem 160 when one or more context tags 150 are associated with the query 102. In some implementations, when one or more context tags 150 are associated with the query 102, the query translator 104 uses the general-purpose translation subsystem and a context-specific subsystem 160 associated with the context tag(s) 150. For example, the query translator 104 may generate two or more translated queries 106 for a particular target language, where the two or more translated queries include a first translated query based on the general-purpose translation subsystem and a second translated query based on the context-specific subsystem(s) 160. In this example, both the first and second translated queries may be used to search the electronic files 132. In some implementations, the first translated query may be used to the search the electronic files 132A associated with the particular target language (TL_1) and the second translated query may be used to search a subset of the electronic files 132A that match (e.g., as indicated by creation date, modification date, created in a geographic region, associated with a topic, etc.) the context tag(s) 150. In another example, the query translator 104 may generate a first translated query based on the general-purpose translation subsystem, may modify the first translated query based on the context-specific subsystem(s) 160, and use the modified version of the first translated query to search at least a subset of the electronic files 132A associated with the particular target language (TL_1).

In some implementations, the query pre-processor 108, the search results post-processor 112, the results translator 116, or any combination thereof, may also, or alternatively, include context-specific subsystems 160 (such as context-specific models 162, context-specific dictionaries 164, or both). For example, the query pre-processor 108 may use a context-specific model 162 or a context-specific dictionary 164 associated with the context tag(s) 150 to expand or limit one of the translated queries 106. As another example, the search results post-processor 112 may use a context-specific model 162 or a context-specific dictionary 164 associated with the context tag(s) 150 to filter or prioritize search results determined by the search engine 110. As still another example, the results translator 116 may use a context-specific model 162 or a context-specific dictionary 164 to translate the search results 114 (e.g., one or more snippets) from one of the target languages to the base language.

In the example illustrated in FIG. 2, the feedback prompts 122 include one or more fields to enable a user to associate one or more context tags 158 with a particular search result of the search results listing 120. For example, the user can assign a context tag 158 associated with one of the context-specific subsystems 160 with the particular search result. Alternatively, the user can define a new context tag 158 and associate the new context tag with the particular search result. In this example, the new context tag 158 may be used by the model controller 152 to generate a new context-specific model 162 or to update an existing context-specific model 162.

Figure 3:
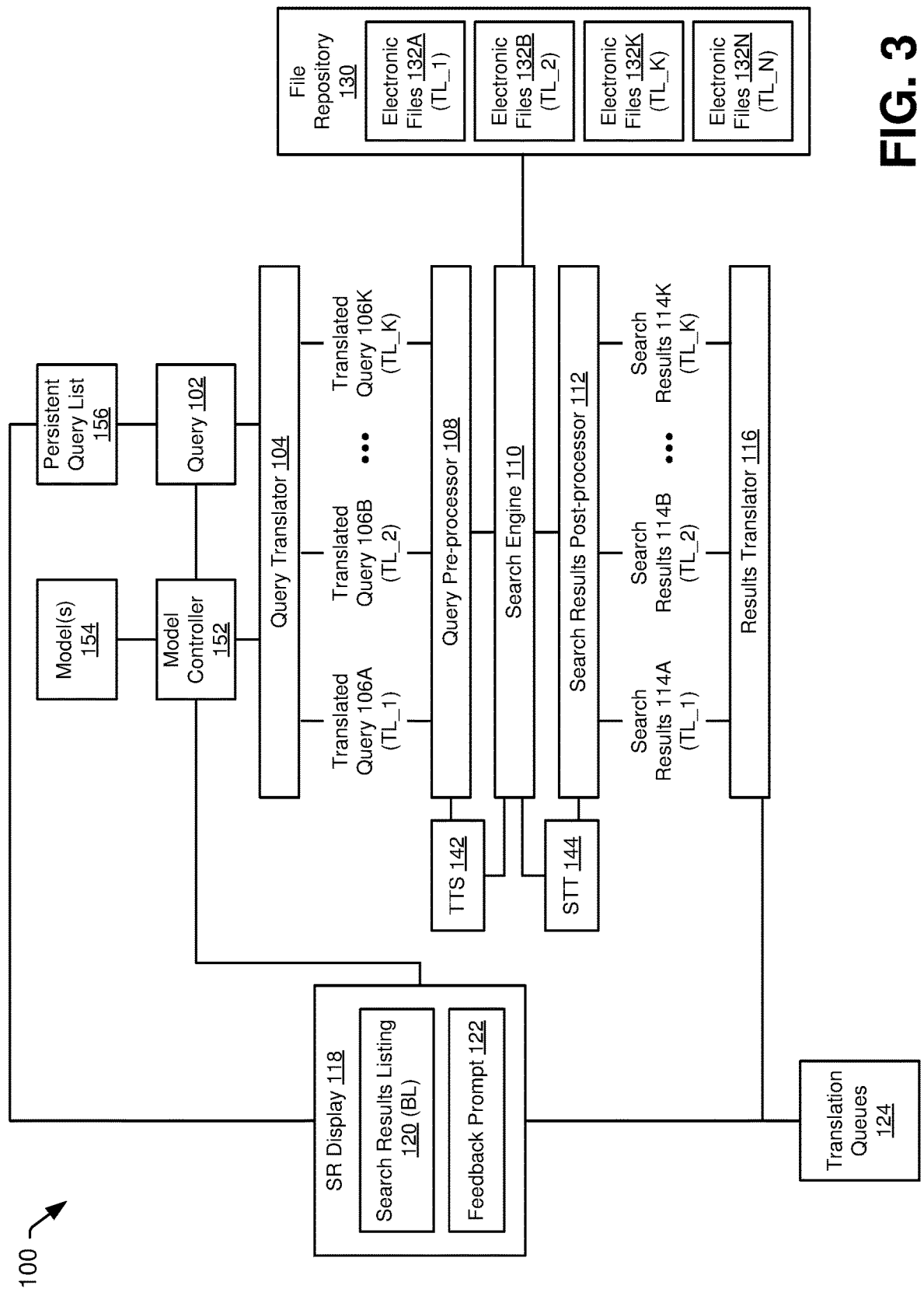
FIG. 3 illustrates another example of a system that is operable to facilitate natural-language processing across multiple languages.

FIG. 3 illustrates another example of the system 100 of FIG. 1. In the example illustrated in FIG. 3, one or more of the electronic files 132 includes audio data representing speech in a target language. In this example, the query pre-processor 108 includes or is associated with one or more text-to-speech (TTS) engines 142, and the search results post-processor 112 includes or is associated with one or more speech-to-text (STT) engines. The system 100 of FIG. 3 also includes other features and components described above with reference to FIG. 1 and may also include features and components described with reference to FIG. 2.

In the system 100 of FIG. 3, one or more of the TTS engines 142 are configured to generate translated query audio data (e.g., data representing speech) based on text of one or more of the translated queries 106. The search engine 110 may compare the translated query audio data to audio data of one or more of the electronic files 132. For example, the TTS engine 142 generates translated query audio data based on text of the translated query 106A associated with a target language (TL_1). The translated query audio data generated by the TTS engine 142 may include an audio signature representing at least a portion of the translated query 106 spoken in the particular target language (TL_1), and the search engine 110 may compare the audio signature to audio data of the electronic files 132A. Audio content can be encoded in different formats, and the specific process used to generate the audio signature depends on the manner in which the audio content of the electronic files 132 is encoded.

In some implementations, a TTS engine 142 for a particular target language may be unavailable or unreliable. In such implementations, the TTS engine 142 may assign generation of an audio signature representing a translated query 106 to a human speaker of the target language.

The system 100 of FIG. 3 also includes a speech-to-text (STT) engine 144 to generate text representing a snippet (e.g., a result snippet) of an electronic file 132 that is considered to be a match for the audio signature representing the translated query 106. Transcription of speech to text to generate a text snippet can require significant computing resources which may not be available at a particular time, in which case the STT engine 144 may schedule generation of a text representation of the particular electronic file (e.g., by adding a task to the translation queues 124) so that transcription can be performed later when resources are available. Further, in some implementations, an STT engine 144 for a particular target language may be unavailable or unreliable. In such implementations, the STT engine 144 may schedule generation of a text snippet by assigning a transcription task to a work queue of a human speaker of the target language.

Figure 4:
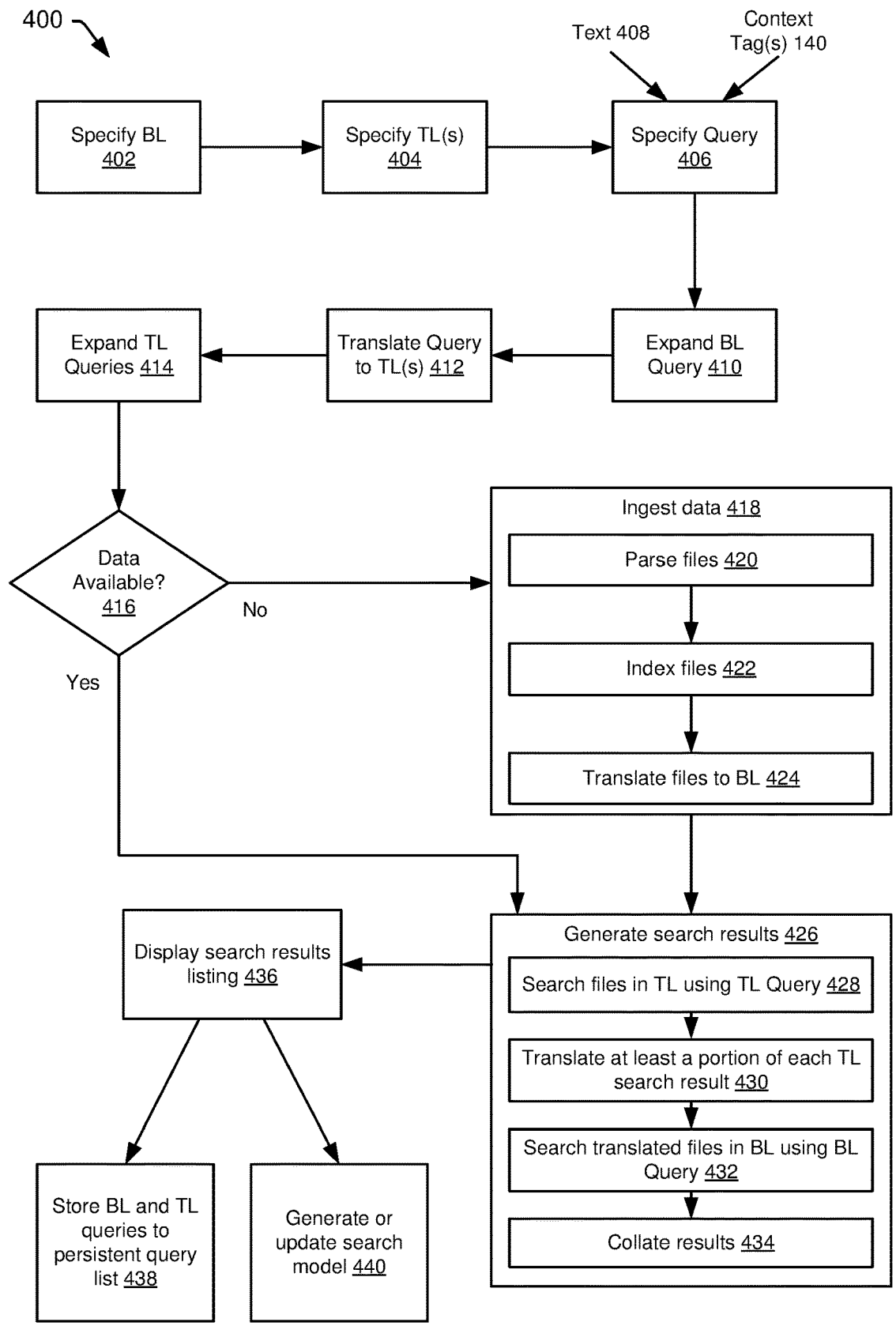
FIG. 4 is a flowchart illustrating an example of aspects of operations that may be performed by any of the systems of FIGS. 1-3.

FIG. 4 is a flowchart illustrating an example 400 of aspects of operations that may be performed by the system 100 of any of FIGS. 1-3. In the example 400, the operations include, at block 402, specifying a base language. For example, a user may specify her own native language or another language in which she is fluent. In some implementations, the base language is specified via configurable query parameters. In other implementations, the base language is specified via a default or pre-selected parameter, such as a system language setting of a computer device that the user is using to initiate a query.

In the example 400, the operations also include, at block 404, specifying one or more target languages. For example, a user may specify a language in which she is not fluent, a language associated with a particular group or location from which information is sought, a language present in one or more electronic files 132 of a file repository 130, etc. In some implementations, the target language(s) are specified via configurable query parameters. In other implementations, the target language(s) are specified via a default or pre-selected parameters. In some implementations, the target language(s) are specified automatically based on languages present in one or more electronic files 132 of a file repository 130. For example, the electronic file(s) 132 may be associated with label data identifying a language or languages known or suspected to be present in the electronic file(s) 132, and the target language(s) may be selected based on the label data.

In the example 400, the operations also include, at block 406, specifying a query 102. In the example 400 the query 102 includes text 408, such as natural language text or structured text indicating terms to be included in or excluded from a search. The query 102 optionally includes one or more context tags 140. A user may specify the query 102 by selecting a persistent query from the persistent query list 156, by providing input via a search interface, or both. In some implementations, a computer automatically specifies a query 102 in response to detecting a trigger event associated with a persistent query, where trigger event may include, for example, passage of a particular period of time, ingestion of new electronic files, or some external event (e.g., a report of a news event in which a particular keyword is used).

In the example 400, the operations further include, at block 410, expanding the query 102 in the base language. For example, the query 102 can be modified to add to one or more base language terms that are semantically similar to a base language term in the query 102. As another example, the query 102 can be modified to add one or more exclusion terms when a term of the query 102 can have more than one meaning in the base language. In some implementation, after expanding the base language query, the expanded query may be displayed to the user for confirmation, rejection, or revision. In some implementations, expansion of the base language query is omitted, such as based on the content of the query 102 (e.g., if the query 102 includes quotation marks around a term, the term may not be expanded), based on user settings, or based on other settings.

In the example 400, the operations also include, at block 412, translating the query 102 (e.g., the specified query or the expanded query in the base language) to the target language(s). For example, the query translator 14 translates the query 102 to the target language(s) as described with reference to FIGS. 1-3.

In the example 400, the operations further include, at block 414, expanding one or more of the target language queries in the respective target language. For example, a translated query 106 can be modified to add to one or more target language terms that are semantically similar to a target language term in the translated query 106 in the target language. As another example, a translated query 106 can be modified to add one or more exclusion terms when a term of the translated query 106 can have more than one meaning in the target language. In some implementations, expansion of the target query 106 is omitted, such as based on the content of the translated query 106, based on user settings, or based on other settings.

In the example 400, the operations include, at block 416, determining whether data to be searched is available (e.g., accessible to the search engine 110). For example, if electronic files 132 that are to be searched have not been ingested for search, the determination at block 416 may be that the data is not available. In this example, if the electronic files 132 that are to be searched have been ingested for search, the determination at block 416 may be that the data is available. In some implementations, the determination of whether data is available is omitted, for example, the search engine 110 may search whatever electronic files 132 are accessible (if any) without making a specific determination of whether data is available.

In the example 400, based on a determination that data to be searched is not available, the operations include, at block 418, ingesting the data. Ingesting the data includes, for example, parsing files, at block 420, and indexing the files, at block 422. In some implementations, ingesting the data may also include, at block 424, translating files (e.g., portions of or the entirety of one or more of the electronic files 132 being ingested) to the base language.

In the example 400, the operations include, at block 426, generating search results 114. In the example 400 of FIG. 4, generating the search results 114 includes, at block 428, searching files in the target language(s) using the target language queries 106. Generating the search results also includes, at block 430, translating at least a portion of each target language search result to the base language. In a particular implementation, generating the search results 114 also includes, at block 432, searching translated files in the base language using the base language query (e.g., the query 102). In other implementations, none of, or not all of, the files are translated to the base language, in which case searching the translated files in the base language may be omitted. Generating the search results may also include, at block 434, collating the results. For example, collating the results may include ordering the search results 114 in a particular order, such as according to likelihood that a particular portion of each search result 114 matches one of the queries (e.g., a base language query 102 or a translated query 106).

In the example 400, the operations include, at block 436, displaying a search results listing. For example, displaying the search results listing includes outputting the search results display 118 of FIG. 1 including the search results listing 120 in the base language and optionally, the feedback prompts 122.

The operations in the example 400 may also include, at block 438, storing one or more base language queries 102, one or more target language queries 106, or both, to the persistent query list 156. For example, a user may provide input directing that the one or more queries be added to the persistent query list 156.

In the example 400, the operations may further include, at block 440, generating or updating a search model (e.g., one of the models 154 of FIG. 1). In a particular implementation, a model 154 is generated or updated based on user input via the search results display 118. For example, a model 154 may be generated or updated based on user input via the feedback prompt 122 that a particular search result is highly pertinent. As another example, a model 154 may be generated or updated based on user input via the feedback prompt 122 that a particular search result is not pertinent (or has low pertinence). In still another example, a model 154 may be generated or updated based on search results 114 generated by translating the queries 102 and searching target language files with the translated queries 106 as compared to search results generated by translating target language files to the base language and searching the base language files with the base language query 102.

Figure 5:
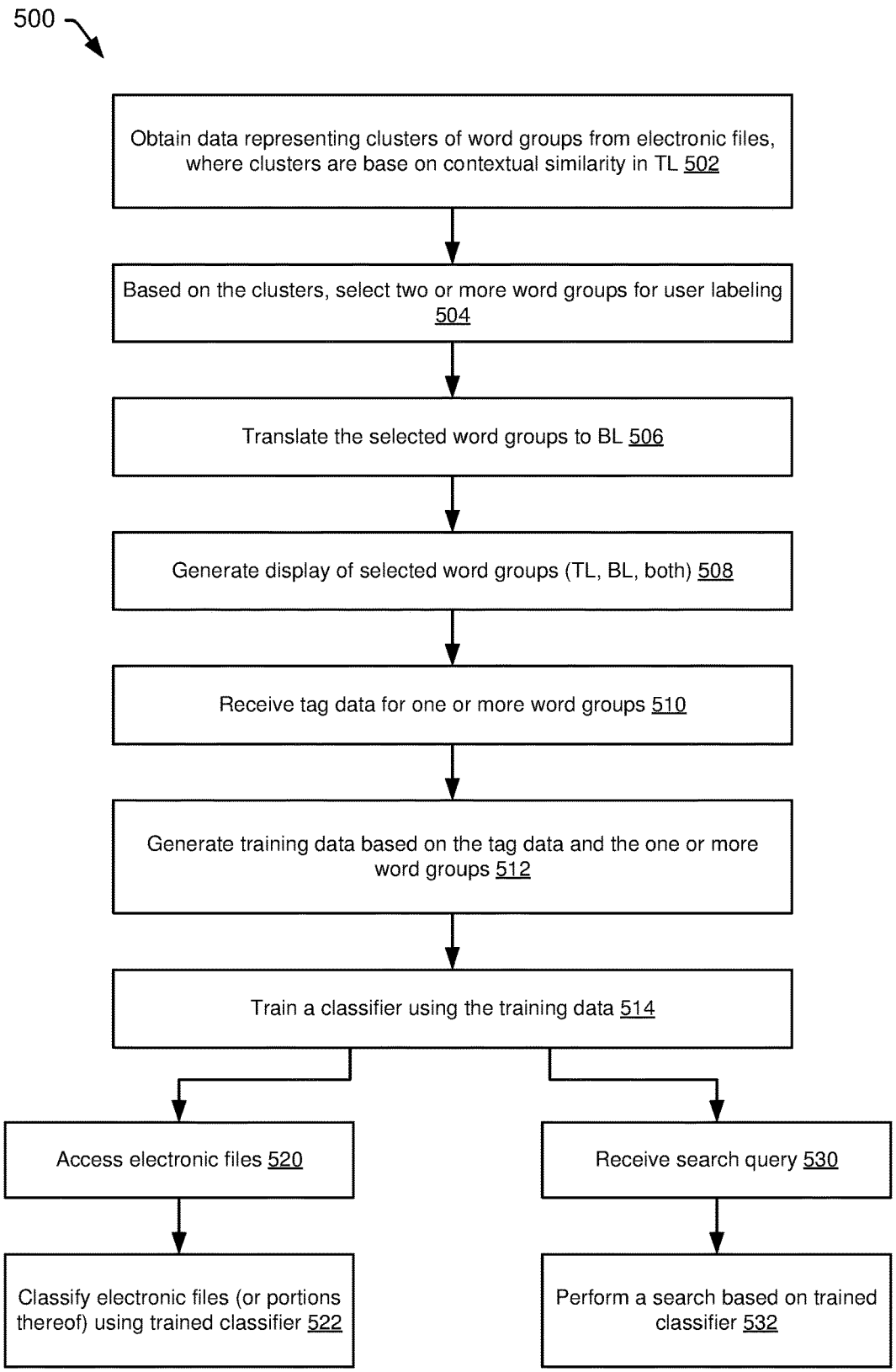
FIG. 5 is a flowchart illustrating an example of aspects of operations that may be performed by any of the systems of FIGS. 1-3.

FIG. 5 is a flowchart illustrating an example 500 of aspects of operations that may be performed by the system 100 of any of FIGS. 1-3. The operations illustrated in the example 500 of FIG. 5 relate to generating, updating, and/or using a model, such as one of the models 154.

In the example 500, the operations include, at block 502, obtaining data representing clusters of word groups from electronic files, where the clusters are based on contextual similarity in a target language. For example, electronic files in the target language may be processed to generate sets of vectors (or similar data representations). In this example, each vector represents a point in a semantic feature space associated with a particular term (e.g., a word or phrase) that is present in the electronic files 132. In this example, a clustering operation can be performed to group points in the features space to form the clusters.

In the example 500, the operations also include, at block 504, selecting, based on the clusters, two or more word groups for user labeling. Particular word groups may be selected for labeling for one of several reasons. For example, a word group near a boundary of a cluster may be selected for labeling to facilitate more clearly defining the boundary of the cluster. To illustrate, the clusters are generated by a computer using numeric processes that attempt to capture semantic relationships based on proximity of points in the feature space. While such numeric processes can define clear boundaries between which terms are and which terms are not included in a particular cluster, a more accurate or more useful (e.g., for the purposes of a particular user) delineation of the boundary may be achieved by asking a user to provide feedback regarding terms that are near the boundary since these terms are least semantically similar to terms in the center of the cluster or are terms of the cluster that are the most semantically similar to terms that are not in the cluster. In another example, one or more word groups near a center of a cluster may be selected as representatives for the entire cluster and may be selected for labeling to facilitate assigning a user-defined label to the entire cluster.

In the example 500, the operations also include, at block 506, translating the selected word groups to the base language, and at block 508, generating a display of the selected word groups (in the base language, in the target language, or both). According to a particular aspect, the display prompts the user to assign a label to one or more of the selected word groups. The operations in the example 500 also include, at block 510, receiving tag data (e.g., one or more labels in the base language) for one or more word groups.

In the example 500, the operations also include, at block 512, generating training data based on the tag data (e.g., in the base language) and associated word group(s) (e.g., in the target language). To illustrate, if the user assigns a first label to a word group of a first cluster, the training data may assign the first label (in the base language) to each term (in the target language) that is assigned to the word group, the first cluster, or both. The operations of the example 500 also include, at block 514, training a classifier using the training data. The classifier includes a machine-learning model (e.g., one of the models 154), such as a neural network, a decision tree, etc., that is trained to determine whether an electronic file 132 (or a portion thereof) in the target language includes terms associated with particular base language tags (e.g., the first label).

In some implementations, the model is useful (alone or with other models) for classifying electronic files that are in the target language. For example, the operations in FIG. 5 may include, at block 520, accessing electronic files, which may include reading one or more of the electronic files 132 from a memory device, generating and storing an electronic file 132 representing a hardcopy of a document (e.g., scanning the document), or both. In such implementations, the operations also include, at block 522, classifying the electronic file(s) using the trained classifier. In an illustrative example, the trained classifier can be used by a remote file collection user to quickly assess whether the accessed electronic files include content of interest even if the remote file collection user is not able to read the target language of the accessed electronic files.

In additional or alternative implementations, the model is useful (alone or with other models) for searching electronic files in the target language. For example, the operations in FIG. 5 may include, at block 530, receiving a search query (e.g., the query 102 of FIG. 1) and, at block 532, performing a search based on the trained classifier. To illustrate, the trained classifier (e.g., one of the models 154) may be used to assign labels to the electronic files 132 as part of ingesting the electronic files 132 into the file repository 130. In this illustrative example, the labels may subsequently be used during searching of the electronic files 132 to limit which electronic files 132 are queried.

In particular implementations, various operations of FIG. 5 are performed at different computing devices. For example, translation operations (such as at block 506) may be performed at a different computing device or computer system than cluster labeling operations (e.g., at blocks 502 and 504), model generation and/or model training operations (e.g., at blocks 512 and 514), searching operations (e.g., at blocks 530 and 532), and/or electronic file classification operations (e.g., at blocks 520 and 522). As another example, model generation and/or model training operations may be performed at a different computing device or computer system than cluster labeling operations, translation operations, searching operations, and/or electronic file classification operations. As another example, cluster labeling operations may be performed at a different computing device or computer system than model generation and/or model training operations, translation operations, searching operations, and/or electronic file classification operations. As another example, searching operations may be performed at a different computing device or computer system than cluster labeling operations, model generation and/or model training operations, translation operations, and/or electronic file classification operations. As another example, electronic file classification operations may be performed at a different computing device or computer system than cluster labeling operations, model generation and/or model training operations, translation operations, and/or searching operations.

Figure 6:
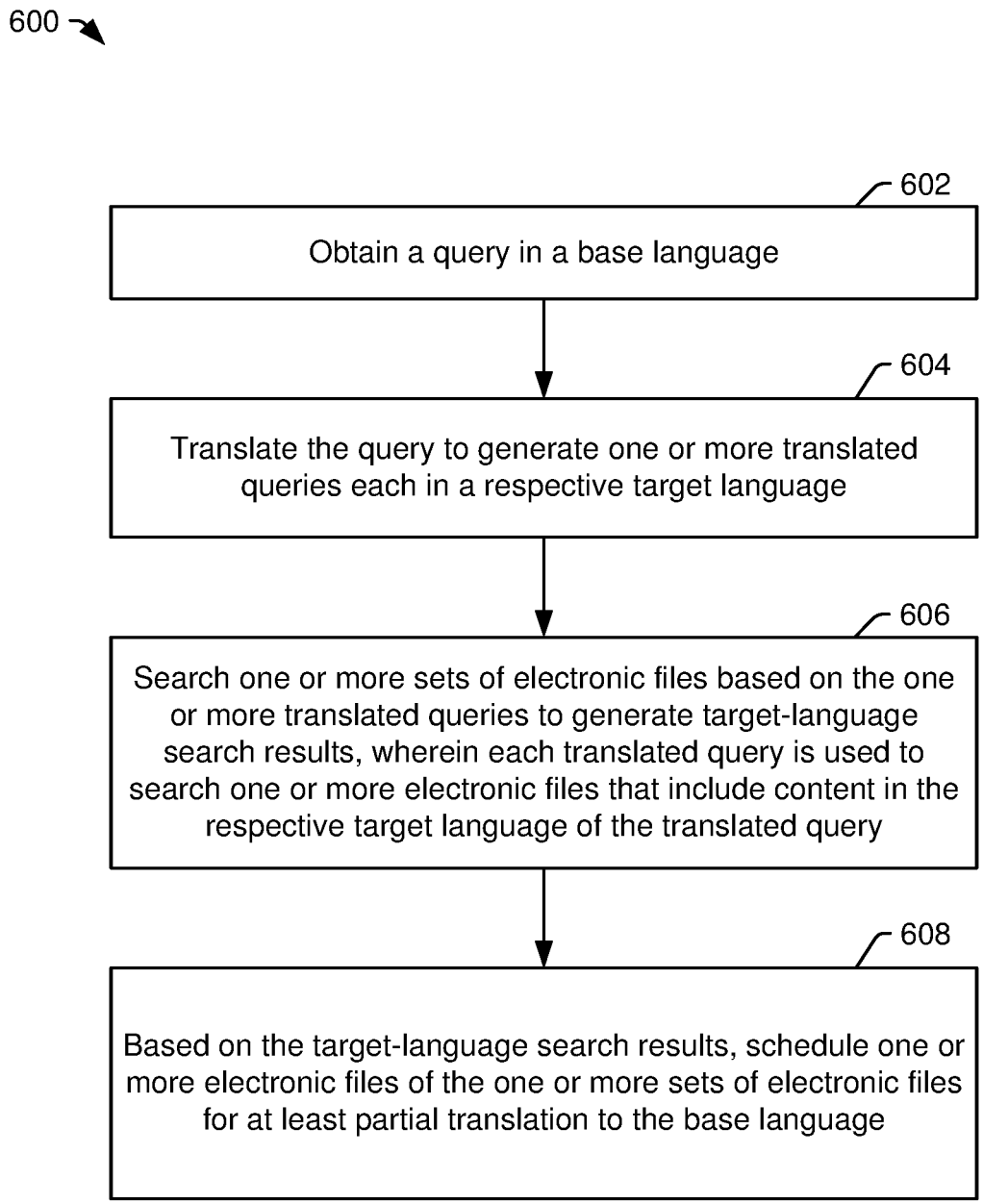
FIG. 6 is a flowchart illustrating a method to facilitate natural-language processing across multiple languages.

FIG. 6 is a flowchart illustrating a method 600 to facilitate natural-language processing across multiple languages. The method 600 may be performed by the system 100 of any of FIGS. 1-3.

The method 600 includes, at block 602, obtaining a query in a base language, and at block 604, translating the query to generate one or more translated queries each in a respective target language. For example, the query translator 104 may receive the query 102 and translate the query 102 to generate one or more translated queries 106 in one or more respective target languages. The query 102 may be obtained via user input or from a persistent query list 156. In some implementations, the target languages for the translated queries 106 are indicated by configurable query parameters. In some implementations, a query 102 may be translated to a target language based on a translation context. In such implementations, the translation context may be indicated by content of the query 102, one or more tags associated with the query 102, user feedback provided via feedback prompts 122 associated with prior searches, etc. In such implementations, the query 102 may be translated to a particular target language based on a context-specific dictionary 164, a context-specific model 162, or both, associated with the translation context.

The method 600 includes, at block 606, searching one or more sets of electronic files based on the one or more translated queries to generate target-language search results. Each translated query is used to search one or more electronic files that include content in the respective target language of the translated query. For example, the search engine 110 may search the electronic files 132 based on the translated queries 106.

The method 600 includes, at block 608, based on the target-language search results, schedule one or more electronic files of the one or more sets of electronic files for at least partial translation to the base language. For example, one or more of the electronic files 132 may be assigned to a translation queue 124 associated with a human translator 128. As another example, one or more of the electronic files 132 may be assigned to a translation queue 124 associated with a machine-learning translator 126. In this context, scheduling an electronic file for at least partial translation includes adding the electronic file (or the portion thereof) to a translation queue, translating the electronic file (or the portion thereof), changing a position of the electronic file (or the portion thereof) in a translation queue, or any combination thereof. In some implementations, scheduling one or more electronic files of the one or more sets of electronic files for at least partial translation to the base language includes translating a snippet of the electronic file for including in a set of base language search results.

Figure 7:
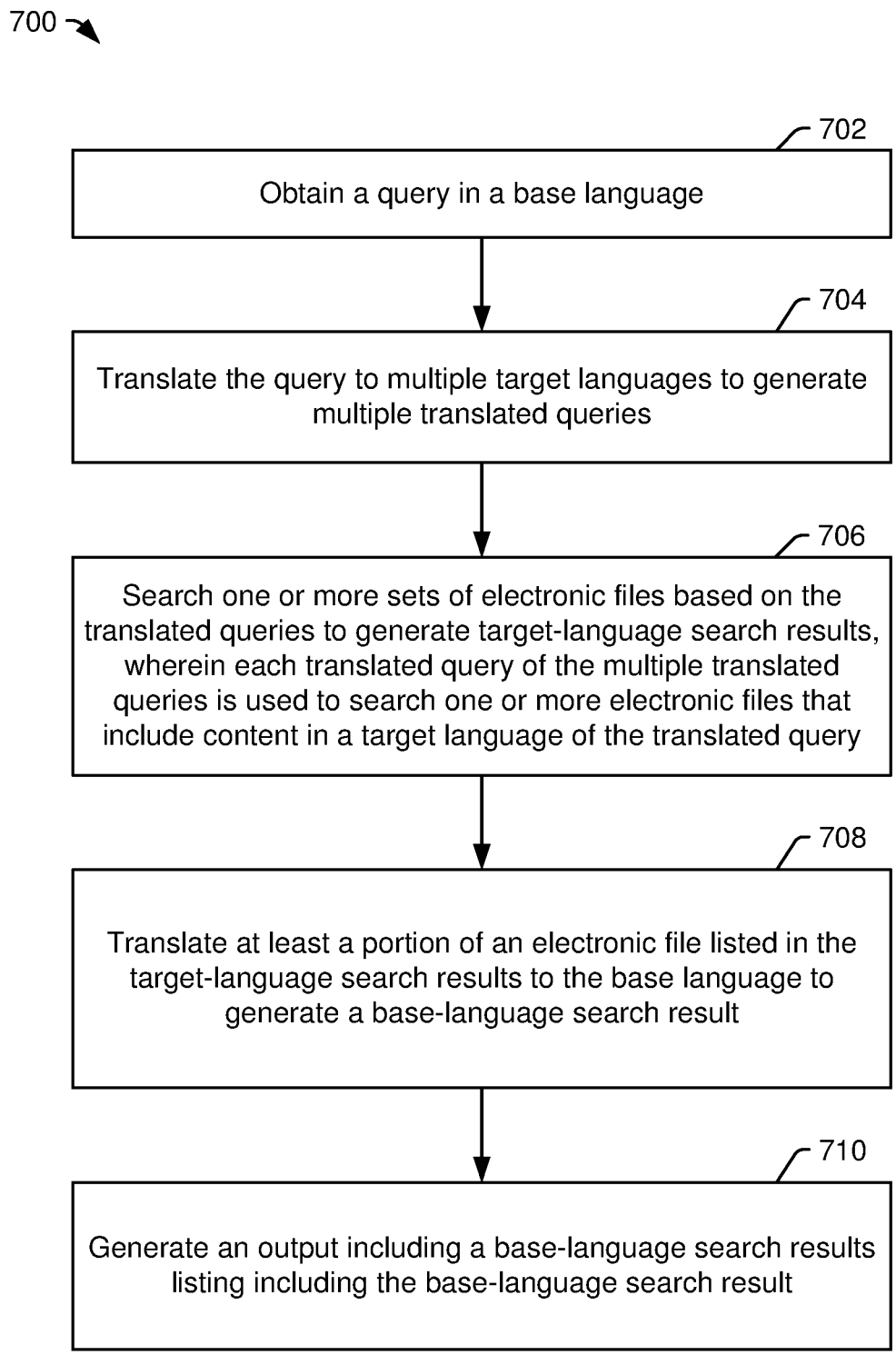
FIG. 7 is a flowchart illustrating a method to facilitate natural-language processing across multiple languages.

FIG. 7 is a flowchart illustrating a method to facilitate natural-language processing across multiple languages. The method 700 may be performed by the system 100 of any of FIGS. 1-3.

The method 700 includes, at block 702, obtaining a query in a base language, and at block 704, translating the query to multiple target languages to generate multiple translated queries. For example, the query translator 104 may receive the query 102 and translate the query 102 to multiple respective target languages to generate multiple translated queries 106. The query may be obtained via user input or from a persistent query list. In some implementations, the target languages for the translated queries are indicated by configurable query parameters. In some implementations, a query may be translated to a target language based in a translation context. In such implementations, the translation context may be indicated by content of the query, one or more tags associated with the query, user feedback provided via feedback prompts associated with prior searches, etc. In such implementations, the query may be translated to a particular target language based on a context-specific dictionary, a context-specific model, or both, associated with the translation context.

The method 700 includes, at block 706, searching one or more sets of electronic files based on the one or more translated queries to generate target-language search results. Each translated query is used to search one or more electronic files that include content in the respective target language of the translated query. For example, the search engine 110 may search the electronic files 132 based on the translated queries 106.

The method 700 includes, at block 708, translating at least a portion of an electronic file listed in the target-language search results to the base language to generate a base-language search result. For example, the results translator 116 may translate a portion of an electronic file 132 identified in a target language search result 114 into the base language. To illustrate, a search result snippet may be selected from the electronic file 132 for translation to the base language.

The method 700 includes, at block 710, generating an output including a base-language search results listing including the base-language search result. For example, the search result display 118 of FIG. 1 may include the base-language search result in the search result listing 120.

Figure 8:
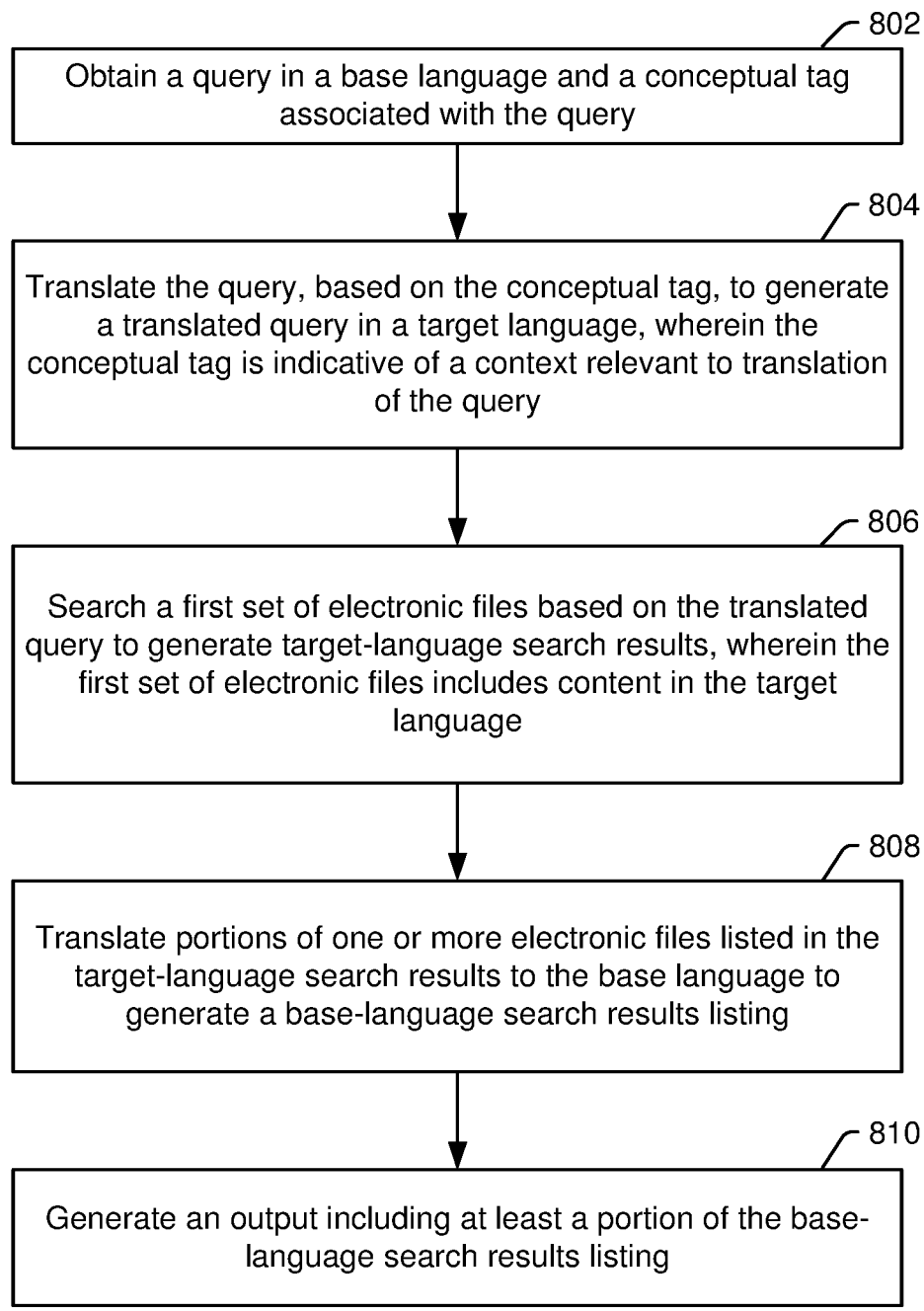
FIG. 8 is a flowchart illustrating a method to facilitate natural-language processing across multiple languages.

FIG. 8 is a flowchart illustrating a method to facilitate natural-language processing across multiple languages. The method 800 may be performed by the system 100 of any of FIGS. 1-3.

The method 800 includes, at block 802, obtaining a query in a base language and obtaining a conceptual tag associated with the query. For example, the query translator 104 of FIG. 2 may receive the query 102 and the context tag(s) 150 associated with the query 102. The query may be obtained via user input or from a persistent query list. Further, the contextual tag may be obtained via user input, from a persistent query list, or from configurable query parameters.

The method 800 also includes, at block 804, translating the query, based on the conceptual tag, to generate a translated query in a target language, wherein the conceptual tag is indicative of a context relevant to translation of the query. For example, the query translator 104 may select one or more context-specific subsystems 160, such as one or more context-specific models 162, one or more context-specific dictionaries 164, or both, for use in translating the query 102.

The method 800 includes, at block 806, searching a first set of electronic files based on the translated query to generate target-language search results, where the first set of electronic files includes content in the target language. For example, the search engine 110 may search the electronic files 132 based on one or more of the translated queries 106.

The method 800 includes, at block 808, translating portions of one or more electronic files listed in the target-language search results to the base language to generate a base-language search results listing. For example, the results translator 116 may translate a portion of an electronic file 132 identified in a target language search result 114 into the base language. To illustrate, a search result snippet may be selected from the electronic file 132 for translation to the base language.

The method 800 includes, at block 810, generating an output including the base-language search results listing. For example, the search result display 118 of FIG. 1 may include the base-language search result in the search result listing 120.

Figure 9:
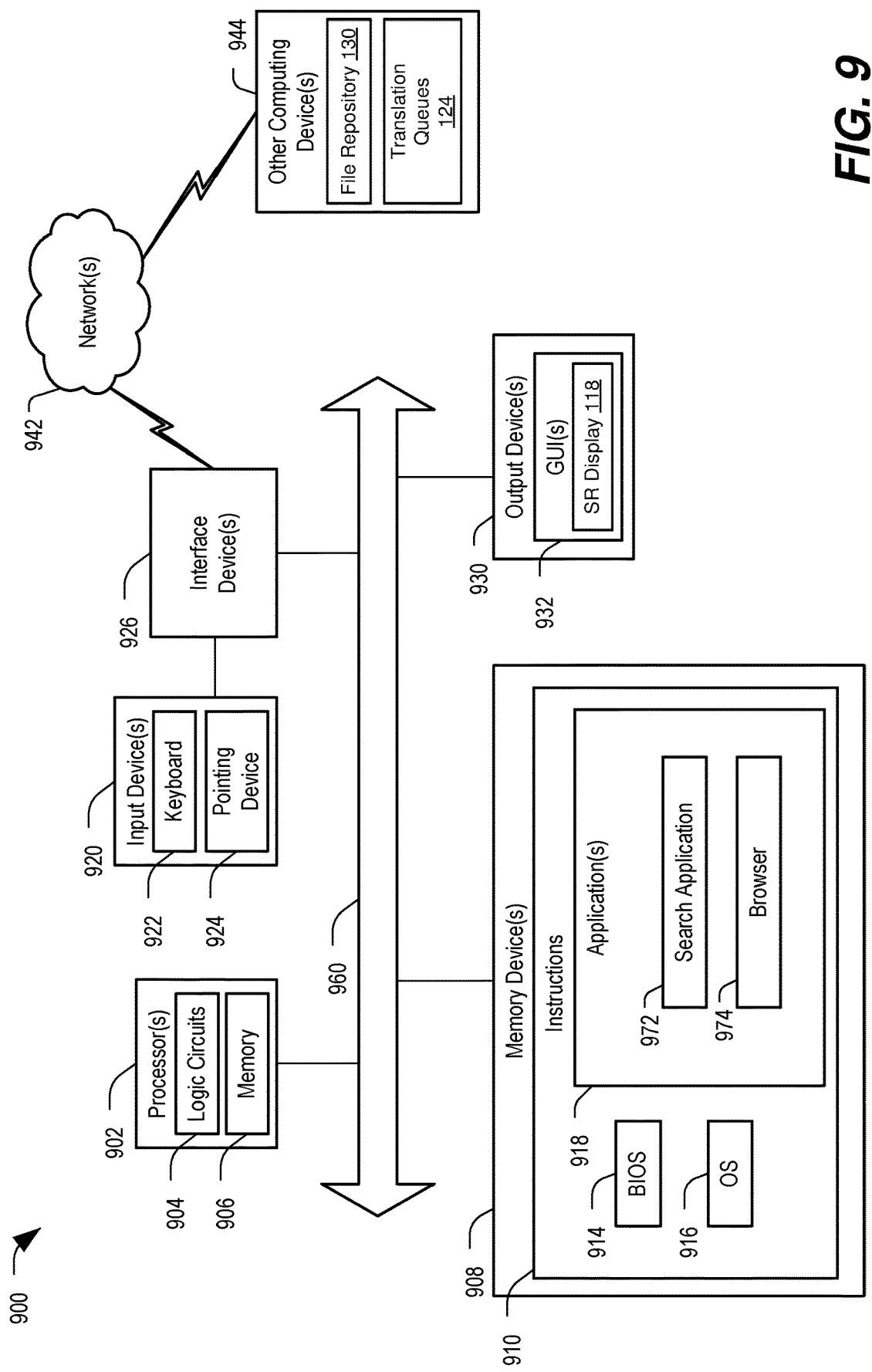
FIG. 9 illustrates a particular example of a computer system including hardware and software configured to facilitate natural-language processing across multiple languages.

FIG. 9 is a block diagram of a particular computer system 900 configured to initiate, perform, or control one or more of the operations described with reference to FIGS. 1-8. For example, the computer system 900 may include, or be included within, or correspond to one or more of the components of the system 100 of FIG. 1, such as the query translator 104, the query pre-processor 108, the search engine 110, the search results post-processor 112, the results translator 116, the search results display 118, the translation queues 124, the model controller 152, or the file repository 130. The computer system 900 can be implemented as or incorporated into one or more of various other devices, such as a personal computer (PC), a tablet PC, a server computer, a personal digital assistant (PDA), a laptop computer, a desktop computer, a communications device, a wireless telephone, or any other machine capable of executing a set of instructions (sequential or otherwise) that specify actions to be taken by that machine. Further, while a single computer system 900 is illustrated, the term "system" includes any collection of systems or sub-systems that individually or jointly execute a set, or multiple sets, of instructions to perform one or more computer functions.

While FIG. 9 illustrates one example of the particular computer system 900, other computer systems or computing architectures and configurations may be used to facilitate natural-language processing across multiple languages as disclosed herein. The computer system 900 includes the one or more processors 902. Each processor of the one or more processors 902 can include a single processing core or multiple processing cores that operate sequentially, in parallel, or sequentially at times and in parallel at other times. Each processor of the one or more processors 902 includes circuitry defining a plurality of logic circuits 904, working memory 906 (e.g., registers and cache memory), communication circuits, etc., which together enable the processor to control the operations performed by the computer system 900 and enable the processor to generate a useful result based on analysis of particular data and execution of specific instructions.

The processor(s) 902 are configured to interact with other components or subsystems of the computer system 900 via a bus 960. The bus 960 is illustrative of any interconnection scheme serving to link the subsystems of the computer system 900, external subsystems or devices, or any combination thereof. The bus 960 includes a plurality of conductors to facilitate communication of electrical and/or electromagnetic signals between the components or subsystems of the computer system 900.

Additionally, the bus 960 includes one or more bus controller or other circuits (e.g., transmitters and receivers) that manage signaling via the plurality of conductors and that cause signals sent via the plurality of conductors to conform to particular communication protocols.

The computer system 900 also includes the one or more memory devices 908. The memory devices 908 include any suitable non-transitory computer-readable storage device depending on, for example, whether data access needs to be bi-directional or unidirectional, speed of data access required, memory capacity required, other factors related to data access, or any combination thereof. Generally, the memory devices 908 include some combinations of volatile memory devices and non-volatile memory devices, though in some implementations, only one or the other may be present. Examples of volatile memory devices and circuits include registers, caches, latches, many types of random-access memory (RAM), such as dynamic random-access memory (DRAM), etc. Examples of non-volatile memory devices and circuits include hard disks, optical disks, flash memory, and certain types of RAM, such as resistive random-access memory (ReRAM). Other examples of both volatile and non-volatile memory devices can be used as well, or in the alternative, so long as such memory devices store information in a physical, tangible medium. Thus, the memory devices 908 include circuits and structures and are not merely signals or other transitory phenomena.

The memory device(s) 908 store the instructions 910 that are executable by the processor(s) 902 to perform various operations and functions. The instructions 910 include instructions to enable the various components and subsystems of the computer system 900 to operate, interact with one another, and interact with a user, such as an input/output system (BIOS) 914 and an operating system (OS) 916. Additionally, the instructions 910 include one or more applications 918, scripts, or other program code to enable the processor(s) 902 to perform the operations described herein. For example, the instructions 910 can include a search application 972 configured to perform one or more of the operations described with reference to any of FIGS. 1-8. As another example, the instructions 910 can include a browser 974 to enable access, via a network, to a search application that is configured to perform one or more of the operations described with reference to any of FIGS. 1-8.

In FIG. 9, the computer system 900 also includes one or more output devices 930, one or more input devices 920, and one or more interface devices 926. Each of the output device(s) 930, the input device(s) 920, and the interface device(s) 926 can be coupled to the bus 960 via a port or connector, such as a Universal Serial Bus (USB) port, a digital visual interface (DVI) port, a serial ATA (SATA) port, a small computer system interface (SCSI) port, a high-definition media interface (HMDI) port, or another serial or parallel port. In some implementations, one or more of the output device(s) 930, the input device(s) 920, or the interface device(s) 926 are coupled to or integrated within a housing with the processor(s) 902 and the memory devices 908, in which case the connections to the bus 960 can be internal, such as via an expansion slot or other card-to-card connector. In other implementations, the processor(s) 902 and the memory devices 908 are integrated within a housing that includes one or more external ports, and one or more of the output device(s) 930, the input device(s) 920, or the interface device(s) 926 are coupled to the bus 960 via the external port(s).

Examples of the output device(s) 930 include display devices, speakers, printers, televisions, projectors, or other devices to provide output of data in a manner that is perceptible by a user, such as via one or more graphical user interfaces 932 ("GUI(s)" in FIG. 9). For example, the graphical user interface(s) 932 may include or correspond to the search results display 118. Examples of the input device(s) 920 include buttons, switches, knobs, a keyboard 922, a pointing device 924, a biometric device, a microphone, a motion sensor, or another device to detect user input actions. The pointing device 924 includes, for example, one or more of a mouse, a stylus, a track ball, a pen, a touch pad, a touch screen, a tablet, another device that is useful for interacting with a graphical user interface, or any combination thereof.

The interface device(s) 926 are configured to enable the computer system 900 to communicate with one or more other computing devices 944 via one or more networks 942. For example, the other computing device(s) 944 may include one or more storage devices, servers, or other computing devices that include or correspond to the file repository 130. As another example, the other computing device(s) 944 may include one or more storage devices, servers, or other computing devices that include or correspond to the translation queues 124. The interface device(s) 926 encode data in electrical and/or electromagnetic signals that are transmitted to the other computer system(s) 944 using pre-defined communication protocols. The electrical and/or electromagnetic signals can be transmitted wirelessly (e.g., via propagation through free space), via one or more wires, cables, optical fibers, or via a combination of wired and wireless transmission.

In an alternative embodiment, dedicated hardware implementations, such as application specific integrated circuits, programmable logic arrays and other hardware devices, can be constructed to implement one or more of the operations described herein. Accordingly, the present disclosure encompasses software, firmware, and hardware implementations.

It is to be understood that the division and ordering of steps described herein is for illustrative purposes only and is not to be considered limiting. In alternative implementations, certain steps may be combined and other steps may be subdivided into multiple steps. Moreover, the ordering of steps may change.

The systems and methods illustrated herein may be described in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, AWK, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of techniques for data transmission, signaling, data processing, network control, and the like.

The systems and methods of the present disclosure may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based (e.g., cloud computing) embodiment, an entirely hardware embodiment, or an embodiment combining aspects of the internet, software and hardware. Furthermore, the system may take the form of a computer program product on a computer-readable storage medium or device having computer-readable program code (e.g., instructions) embodied or stored in the storage medium or device. Any suitable computer-readable storage medium or device may be utilized, including hard disks, CD-ROM, optical storage devices, magnetic storage devices, and/or other storage media. As used herein, a "computer-readable storage medium" or "computer-readable storage device" is not a signal.

Computer program instructions may be loaded onto a computer or other programmable data processing apparatus to produce a machine, such that the instructions that execute on the computer or other programmable data processing apparatus create means for implementing operations or functions specified in flowchart block or blocks. These computer program instructions may also be stored in a computer-readable memory or device that can direct a computer or other programmable data processing apparatus to function in a particular manner, such that the instructions stored in the computer-readable memory produce an article of manufacture including instruction means which implement the operation or function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the operations or functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Particular aspects of the disclosure are described below in the following clauses:

Clause 1 includes a method including: obtaining a query in a base language; translating the query to generate one or more translated queries each in a respective target language; searching one or more sets of electronic files based on the one or more translated queries to generate target-language search results, wherein each translated query is used to search one or more electronic files that include content in the respective target language of the translated query; and based on the target-language search results, scheduling one or more electronic files of the one or more sets of electronic files for at least partial translation to the base language.

Clause 2 includes the method of Clause 1, further including saving the query to a persistent query list for use in searching one or more additional electronic files that become available after the searching of the one or more sets of electronic files.

Clause 3 includes the method of Clause 1 or Clause 2, further including saving the one or more translated queries to a persistent query list for use in searching one or more additional electronic files that become available after the searching of the one or more sets of electronic files.

Clause 4 includes the method of any of Clauses 1 to 3, further including, before translating the query to generate the one or more translated queries, selecting, based on configurable query parameters, one or more target languages for the one or more translated queries.

Clause 5 includes the method of Clause 4, wherein the configurable query parameters are determined based on a data acquisition requirement.

Clause 6 includes the method of any of Clauses 1 to 5, further including determining a translation context, wherein the query is translated to a particular target language based, at least partially, on a context-specific dictionary.

Clause 7 includes the method of any of Clauses 1 to 6, further including: translating, to the base language, a snippet of an electronic file listed in the target-language search results to generate a base-language search results snippet; generating an output including at least a portion of the base-language search results snippet; receiving user input indicating a level of pertinence of the base-language search results snippet; and determining whether to update a translation schedule based on the user input.

Clause 8 includes the method of any of Clauses 1 to 7, further including: translating, from a particular target language to the base language, a snippet of an electronic file listed in the target-language search results to generate a base-language search results snippet; generating an output including at least a portion of the base-language search results snippet; receiving user input indicating a level of pertinence of the base-language search results snippet; and determining whether to modify a particular translated query of the one or more translated queries based on the user input, wherein the particular translated query is in the particular target language.

Clause 9 includes the method of any of Clauses 1 to 8, further including: translating, from a target language to the base language, a snippet of an electronic file listed in the target-language search results to generate a base-language search results snippet; generating an output including at least a portion of the base-language search results snippet; receiving user input indicating a level of pertinence of the base-language search results snippet; and generating or updating a machine-learning model based on the user input.

Clause 10 includes the method of Clause 9, further including, during a subsequent search operation, using the machine-learning model to filter search results, to expand a search query, or both.

Clause 11 includes the method of Clause 9 or Clause 10, further including using the machine-learning model to assign label data to one or more electronic files or portions of the one or more electronic files.

Clause 12 includes the method of any of Clauses 1 to 11, wherein scheduling the one or more electronic files for at least partial translation to the base language includes updating a work queue of a machine translation process.

Clause 13 includes the method of any of Clauses 1 to 12, wherein scheduling a particular electronic file of the one or more electronic files for at least partial translation to the base language includes assigning a translation task to a speaker of a target language of the particular electronic file.

Clause 14 includes the method of any of Clauses 1 to 13, wherein at least one of the one or more sets of electronic files includes text.

Clause 15 includes the method of any of Clauses 1 to 14, wherein a particular electronic file of the one or more sets of electronic files includes audio data representing speech in a particular target language, the method further including: after translating the query to generate a translated query in the particular target language, generating an audio signature representing at least a portion of the translated query spoken in the particular target language, and wherein the searching the one or more sets of electronic files includes comparing the audio signature to the audio data.

Clause 16 includes the method of Clause 15, further including, based on a result of comparing the audio signature to the audio data, scheduling generation of a text representation of the particular electronic file.

Clause 17 includes the method of Clause 16, wherein scheduling generation of the text representation of the particular electronic file includes updating a work queue of a speech-to-text process.

Clause 18 includes the method of Clause 16 or Clause 17, wherein scheduling generation of the text representation of the particular electronic file includes assigning a transcription task to a speaker of the particular target language.

Clause 19 includes a device including: one or more processors configured to: obtain a query in a base language; translate the query to generate one or more translated queries each in a respective target language; search one or more sets of electronic files based on the one or more translated queries to generate target-language search results, wherein each translated query is used to search one or more electronic files that include content in the respective target language of the translated query; and based on the target-language search results, schedule one or more electronic files of the one or more sets of electronic files for at least partial translation to the base language.

Clause 20 includes the device of Clause 19, wherein the one or more processors are further configured to save the query to a persistent query list for use in searching one or more additional electronic files that become available after the searching of the one or more sets of electronic files.

Clause 21 includes the device of Clause 19 or Clause 20, wherein the one or more processors are further configured to save the one or more translated queries to a persistent query list for use in searching one or more additional electronic files that become available after the searching of the one or more sets of electronic files.

Clause 22 includes the device of any of Clauses 19 to 21, wherein the one or more processors are further configured to, before translating the query to generate the one or more translated queries, select, based on configurable query parameters, one or more target languages for the one or more translated queries.

Clause 23 includes the device of Clause 22, wherein the configurable query parameters are determined based on a data acquisition requirement.

Clause 24 includes the device of any of Clauses 19 to 23, wherein the one or more processors are further configured to determine a translation context, wherein the query is translated to a particular target language based, at least partially, on a context-specific dictionary.

Clause 25 includes the device of any of Clauses 19 to 24, wherein the one or more processors are further configured to: translate, to the base language, a snippet of an electronic file listed in the target-language search results to generate a base-language search results snippet; generate an output including at least a portion of the base-language search results snippet; receive user input indicating a level of pertinence of the base-language search results snippet; and determine whether to update a translation schedule based on the user input.

Clause 26 includes the device of any of Clauses 19 to 25, wherein the one or more processors are further configured to: translate, from a particular target language to the base language, a snippet of an electronic file listed in the target-language search results to generate a base-language search results snippet; generate an output including at least a portion of the base-language search results snippet; receive user input indicating a level of pertinence of the base-language search results snippet; and determine whether to modify a particular translated query of the one or more translated queries based on the user input, wherein the particular translated query is in the particular target language.

Clause 27 includes the device of any of Clauses 19 to 26, wherein the one or more processors are further configured to: translate, from a target language to the base language, a snippet of an electronic file listed in the target-language search results to generate a base-language search results snippet; generate an output including at least a portion of the base-language search results snippet; receive user input indicating a level of pertinence of the base-language search results snippet; and generate or updating a machine-learning model based on the user input.

Clause 28 includes the device of Clause 27, wherein the one or more processors are further configured to, during a subsequent search operation, use the machine-learning model to filter search results, to expand a search query, or both.

Clause 29 includes the device of Clause 27 or Clause 28, wherein the one or more processors are further configured to use the machine-learning model to assign label data to one or more electronic files or portions of the one or more electronic files.

Clause 30 includes the device of any of Clauses 19 to 29, wherein scheduling the one or more electronic files for at least partial translation to the base language includes updating a work queue of a machine translation process.

Clause 31 includes the device of any of Clauses 19 to 30, wherein scheduling a particular electronic file of the one or more electronic files for at least partial translation to the base language includes assigning a translation task to a speaker of a target language of the particular electronic file.

Clause 32 includes the device of any of Clauses 19 to 31, wherein at least one of the one or more sets of electronic files includes text.

Clause 33 includes the device of any of Clauses 19 to 32, wherein a particular electronic file of the one or more sets of electronic files includes audio data representing speech in a particular target language, and wherein the one or more processors are further configured to: after translating the query to generate a translated query in the particular target language, generate an audio signature representing at least a portion of the translated query spoken in the particular target language, and wherein the searching the one or more sets of electronic files includes comparing the audio signature to the audio data.

Clause 34 includes the device of Clause 33, wherein the one or more processors are further configured to, based on a result of comparing the audio signature to the audio data, schedule generation of a text representation of the particular electronic file.

Clause 35 includes the device of Clause 34, wherein scheduling generation of the text representation of the particular electronic file includes updating a work queue of a speech-to-text process.

Clause 36 includes the device of Clause 34 or Clause 35, wherein scheduling generation of the text representation of the particular electronic file includes assigning a transcription task to a speaker of the particular target language.

Clause 37 includes a non-transitory computer-readable medium storing instructions that, when executed by one or more processors, cause the one or more processors to: obtain a query in a base language; translate the query to generate one or more translated queries each in a respective target language; search one or more sets of electronic files based on the one or more translated queries to generate target-language search results, wherein each translated query is used to search one or more electronic files that include content in the respective target language of the translated query; and based on the target-language search results, schedule one or more electronic files of the one or more sets of electronic files for at least partial translation to the base language.

Clause 38 includes the non-transitory computer-readable medium of Clause 37, wherein execution of the instructions further causes the one or more processors to save the query to a persistent query list for use in searching one or more additional electronic files that become available after the searching of the one or more sets of electronic files.

Clause 39 includes the non-transitory computer-readable medium of Clause 37 or

Clause 38, wherein execution of the instructions further causes the one or more processors to save the one or more translated queries to a persistent query list for use in searching one or more additional electronic files that become available after the searching of the one or more sets of electronic files.

Clause 40 includes the non-transitory computer-readable medium of any of Clauses 37 to 39, wherein execution of the instructions further causes the one or more processors to, before translating the query to generate the one or more translated queries, select, based on configurable query parameters, one or more target languages for the one or more translated queries.

Clause 41 includes the non-transitory computer-readable medium of Clause 40, wherein the configurable query parameters are determined based on a data acquisition requirement.

Clause 42 includes the non-transitory computer-readable medium of any of Clauses 37 to 41, wherein execution of the instructions further causes the one or more processors to determine a translation context, wherein the query is translated to a particular target language based, at least partially, on a context-specific dictionary.

Clause 43 includes the non-transitory computer-readable medium of any of Clauses 37 to 42, wherein execution of the instructions further causes the one or more processors to: translate, to the base language, a snippet of an electronic file listed in the target-language search results to generate a base-language search results snippet; generate an output including at least a portion of the base-language search results snippet; receive user input indicating a level of pertinence of the base-language search results snippet; and determine whether to update a translation schedule based on the user input.

Clause 44 includes the non-transitory computer-readable medium of any of Clauses 37 to 43, wherein execution of the instructions further causes the one or more processors to: translate, from a particular target language to the base language, a snippet of an electronic file listed in the target-language search results to generate a base-language search results snippet; generate an output including at least a portion of the base-language search results snippet; receive user input indicating a level of pertinence of the base-language search results snippet; and determine whether to modify a particular translated query of the one or more translated queries based on the user input, wherein the particular translated query is in the particular target language.

Clause 45 includes the non-transitory computer-readable medium of any of Clauses 37 to 44, wherein execution of the instructions further causes the one or more processors to: translate, from a target language to the base language, a snippet of an electronic file listed in the target-language search results to generate a base-language search results snippet; generate an output including at least a portion of the base-language search results snippet; receive user input indicating a level of pertinence of the base-language search results snippet; and generate or updating a machine-learning model based on the user input.

Clause 46 includes the non-transitory computer-readable medium of Clause 45, wherein execution of the instructions further causes the one or more processors to, during a subsequent search operation, use the machine-learning model to filter search results, to expand a search query, or both.

Clause 47 includes the non-transitory computer-readable medium of Clause 45 or

Clause 46, wherein execution of the instructions further causes the one or more processors to use the machine-learning model to assign label data to one or more electronic files or portions of the one or more electronic files.

Clause 48 includes the non-transitory computer-readable medium of any of Clauses 37 to 47, wherein scheduling the one or more electronic files for at least partial translation to the base language includes updating a work queue of a machine translation process.

Clause 49 includes the non-transitory computer-readable medium of any of Clauses 37 to 48, wherein scheduling a particular electronic file of the one or more electronic files for at least partial translation to the base language includes assigning a translation task to a speaker of a target language of the particular electronic file.

Clause 50 includes the non-transitory computer-readable medium of any of Clauses 37 to 49, wherein at least one of the one or more sets of electronic files includes text.

Clause 51 includes the non-transitory computer-readable medium of any of Clauses 37 to 50, wherein a particular electronic file of the one or more sets of electronic files includes audio data representing speech in a particular target language, and wherein execution of the instructions further causes the one or more processors to: after translating the query to generate a translated query in the particular target language, generate an audio signature representing at least a portion of the translated query spoken in the particular target language, and wherein the searching the one or more sets of electronic files includes comparing the audio signature to the audio data.

Clause 52 includes the non-transitory computer-readable medium of Clause 51, wherein execution of the instructions further causes the one or more processors to, based on a result of comparing the audio signature to the audio data, schedule generation of a text representation of the particular electronic file.

Clause 53 includes the non-transitory computer-readable medium of Clause 52, wherein scheduling generation of the text representation of the particular electronic file includes updating a work queue of a speech-to-text process.

Clause 54 includes the non-transitory computer-readable medium of Clause 52 or

Clause 53, wherein scheduling generation of the text representation of the particular electronic file includes assigning a transcription task to a speaker of the particular target language.

Clause 55 includes a method including: obtaining a query in a base language; translating the query to multiple target languages to generate multiple translated queries; searching one or more sets of electronic files based on the translated queries to generate target-language search results, wherein each translated query of the multiple translated queries is used to search one or more electronic files that include content in a target language of the translated query; translating at least a portion of an electronic file listed in the target-language search results to the base language to generate a base-language search result; and generating an output including a base-language search results listing including the base-language search result.

Clause 56 includes the method of Clause 55, further including: receiving input indicating a level of pertinence of a particular base-language search result of the base-language search results listing; and based on the input, scheduling further translation of an electronic file corresponding to the particular base-language search result.

Clause 57 includes the method of Clause 55 or Clause 56, further including saving the query to a persistent query list for use in searching one or more additional electronic files that become available after the searching of the one or more sets of electronic files.

Clause 58 includes the method of any of Clauses 55 to 57, further including saving the translated queries to a persistent query list for use in searching one or more additional electronic files that become available after the searching of the one or more sets of electronic files.

Clause 59 includes the method of any of Clauses 55 to 58, further including, before translating the query to generate the translated queries, selecting the target languages based on configurable query parameters.

Clause 60 includes the method of Clause 59, wherein the configurable query parameters are determined based on a data acquisition requirement.

Clause 61 includes the method of any of Clauses 55 to 60, further including determining a translation context, wherein the query is translated to a particular target language of the multiple target languages based, at least partially, on a context-specific dictionary associated with the particular target language.

Clause 62 includes the method of any of Clauses 55 to 61, further including: translating, to the base language, a snippet of an electronic file listed in the target-language search results to generate a base-language search results snippet, wherein the output includes at least a portion of the base-language search results snippet; receiving user input indicating a level of pertinence of the base-language search results snippet; and determining whether to update a translation schedule based on the user input.

Clause 63 includes the method of any of Clauses 55 to 62, further including: translating, to the base language, a snippet of an electronic file listed in the target-language search results to generate a base-language search results snippet, wherein the output includes at least a portion of the base-language search results snippet; receiving user input indicating a level of pertinence of the base-language search results snippet; and determining whether to modify a particular translated query of the multiple translated queries based on the user input.

Clause 64 includes the method of any of Clauses 55 to 63, further including: translating, to the base language, a snippet of an electronic file listed in the target-language search results to generate a base-language search results snippet, wherein the output includes at least a portion of the base-language search results snippet; receiving user input indicating a level of pertinence of the base-language search results snippet; and generating or updating a machine-learning model based on the user input.

Clause 65 includes the method of Clause 64, further including, during a subsequent search operation, using the machine-learning model to filter search results, to expand a search query, or both.

Clause 66 includes the method of Clause 64 or Clause 65, further including using the machine-learning model to assign label data to one or more electronic files or portions of the one or more electronic files.

Clause 67 includes the method of any of Clauses 55 to 66, further including: receiving user input indicating a level of pertinence of a particular base-language search result of the base-language search results listing; and based on the user input, scheduling a particular electronic file associated with the particular base-language search result for further translation.

Clause 68 includes the method of Clause 67, wherein scheduling the particular electronic file for further translation includes assigning a translation task to a speaker of a target language of the particular electronic file.

Clause 69 includes the method of any of Clauses 55 to 68, wherein at least one of the one or more sets of electronic files includes text.

Clause 70 includes the method of any of Clauses 55 to 69, wherein a particular electronic file of the one or more sets of electronic files includes audio data representing speech in a particular target language, the method further including: after translating the query to generate a particular translated query in the particular target language, generating an audio signature representing at least a portion of the particular translated query spoken in the particular target language, and wherein the searching the one or more sets of electronic files includes comparing the audio signature to the audio data.

Clause 71 includes the method of Clause 70, further including, based on a result of comparing the audio signature to the audio data, scheduling generation of a text representation of the particular electronic file.

Clause 72 includes the method of Clause 71, wherein scheduling generation of the text representation of the particular electronic file includes updating a work queue of a speech-to-text process.

Clause 73 includes the method of Clause 71 or Clause 72, wherein scheduling generation of the text representation of the particular electronic file includes assigning a transcription task to a speaker of the particular target language.

Clause 74 includes a device including: one or more processors configured to: obtain a query in a base language; translate the query to multiple target languages to generate multiple translated queries; search one or more sets of electronic files based on the translated queries to generate target-language search results, wherein each translated query of the multiple translated queries is used to search one or more electronic files that include content in a target language of the translated query; translate at least a portion of an electronic file listed in the target-language search results to the base language to generate a base-language search result; and generate an output including a base-language search results listing including the base-language search result.

Clause 75 includes the device of Clause 74, wherein the one or more processors are further configured to: receive input indicating a level of pertinence of a particular base-language search result of the base-language search results listing; and based on the input, schedule further translation of an electronic file corresponding to the particular base-language search result.

Clause 76 includes the device of Clause 74 or Clause 75, wherein the one or more processors are further configured to save the query to a persistent query list for use in searching one or more additional electronic files that become available after the searching of the one or more sets of electronic files.

Clause 77 includes the device of any of Clauses 74 to 76, wherein the one or more processors are further configured to save the translated queries to a persistent query list for use in searching one or more additional electronic files that become available after the searching of the one or more sets of electronic files.

Clause 78 includes the device of any of Clauses 74 to 77, wherein the one or more processors are further configured to, before translating the query to generate the translated queries, select the target languages based on configurable query parameters.

Clause 79 includes the device of Clause 78, wherein the configurable query parameters are determined based on a data acquisition requirement.

Clause 80 includes the device of any of Clauses 74 to 79, wherein the one or more processors are further configured to determine a translation context, wherein the query is translated to a particular target language of the multiple target languages based, at least partially, on a context-specific dictionary associated with the particular target language.

Clause 81 includes the device of any of Clauses 74 to 80, wherein the one or more processors are further configured to: translate, to the base language, a snippet of an electronic file listed in the target-language search results to generate a base-language search results snippet, wherein the output includes at least a portion of the base-language search results snippet; receive user input indicating a level of pertinence of the base-language search results snippet; and determine whether to update a translation schedule based on the user input.

Clause 82 includes the device of any of Clauses 74 to 81, wherein the one or more processors are further configured to: translate, to the base language, a snippet of an electronic file listed in the target-language search results to generate a base-language search results snippet, wherein the output includes at least a portion of the base-language search results snippet; receive user input indicating a level of pertinence of the base-language search results snippet; and determine whether to modify a particular translated query of the multiple translated queries based on the user input.

Clause 83 includes the device of any of Clauses 74 to 82, wherein the one or more processors are further configured to: translate, to the base language, a snippet of an electronic file listed in the target-language search results to generate a base-language search results snippet, wherein the output includes at least a portion of the base-language search results snippet; receive user input indicating a level of pertinence of the base-language search results snippet; and generate or update a machine-learning model based on the user input.

Clause 84 includes the device of Clause 83, wherein the one or more processors are further configured to, during a subsequent search operation, use the machine-learning model to filter search results, to expand a search query, or both.

Clause 85 includes the device of Clause 83 or Clause 84, wherein the one or more processors are further configured to use the machine-learning model to assign label data to one or more electronic files or portions of the one or more electronic files.

Clause 86 includes the device of any of Clauses 74 to 85, wherein the one or more processors are further configured to: receive user input indicating a level of pertinence of a particular base-language search result of the base-language search results listing; and based on the user input, schedule a particular electronic file associated with the particular base-language search result for further translation.

Clause 87 includes the device of Clause 86, wherein scheduling the particular electronic file for further translation includes assigning a translation task to a speaker of a target language of the particular electronic file.

Clause 88 includes the device of any of Clauses 74 to 87, wherein at least one of the one or more sets of electronic files includes text.

Clause 89 includes the device of any of Clauses 74 to 88, wherein a particular electronic file of the one or more sets of electronic files includes audio data representing speech in a particular target language, wherein the one or more processors are further configured to: after translating the query to generate a particular translated query in the particular target language, generate an audio signature representing at least a portion of the particular translated query spoken in the particular target language, and wherein the searching the one or more sets of electronic files includes comparing the audio signature to the audio data.

Clause 90 includes the device of Clause 89, wherein the one or more processors are further configured to, based on a result of comparing the audio signature to the audio data, schedule generation of a text representation of the particular electronic file.

Clause 91 includes the device of Clause 90, wherein scheduling generation of the text representation of the particular electronic file includes updating a work queue of a speech-to-text process.

Clause 92 includes the device of Clause 90 or Clause 91, wherein scheduling generation of the text representation of the particular electronic file includes assigning a transcription task to a speaker of the particular target language.

Clause 93 includes a non-transitory computer-readable medium storing instructions that, when executed by one or more processors, cause the one or more processors to: obtain a query in a base language; translate the query to multiple target languages to generate multiple translated queries; search one or more sets of electronic files based on the translated queries to generate target-language search results, wherein each translated query of the multiple translated queries is used to search one or more electronic files that include content in a target language of the translated query; translate at least a portion of an electronic file listed in the target-language search results to the base language to generate a base-language search result; and generate an output including a base-language search results listing including the base-language search result.

Clause 94 includes the non-transitory computer-readable medium of Clause 93, wherein execution of the instructions further causes the one or more processors to: receive input indicating a level of pertinence of a particular base-language search result of the base-language search results listing; and based on the input, schedule further translation of an electronic file corresponding to the particular base-language search result.

Clause 95 includes the non-transitory computer-readable medium of Clause 93 or

Clause 94, wherein execution of the instructions further causes the one or more processors to save the query to a persistent query list for use in searching one or more additional electronic files that become available after the searching of the one or more sets of electronic files.

Clause 96 includes the non-transitory computer-readable medium of any of Clauses 93 to 95, wherein execution of the instructions further causes the one or more processors to save the translated queries to a persistent query list for use in searching one or more additional electronic files that become available after the searching of the one or more sets of electronic files.

Clause 97 includes the non-transitory computer-readable medium of any of Clauses 93 to 96, wherein execution of the instructions further causes the one or more processors to, before translating the query to generate the translated queries, select the target languages based on configurable query parameters.

Clause 98 includes the non-transitory computer-readable medium of Clause 97, wherein the configurable query parameters are determined based on a data acquisition requirement.

Clause 99 includes the non-transitory computer-readable medium of any of Clauses 93 to 98, wherein execution of the instructions further causes the one or more processors to determine a translation context, wherein the query is translated to a particular target language of the multiple target languages based, at least partially, on a context-specific dictionary associated with the particular target language.

Clause 100 includes the non-transitory computer-readable medium of any of Clauses 93 to 99, wherein execution of the instructions further causes the one or more processors to: translate, to the base language, a snippet of an electronic file listed in the target-language search results to generate a base-language search results snippet, wherein the output includes at least a portion of the base-language search results snippet; receive user input indicating a level of pertinence of the base-language search results snippet; and determine whether to update a translation schedule based on the user input.

Clause 101 includes the non-transitory computer-readable medium of any of Clauses 93 to 100, wherein execution of the instructions further causes the one or more processors to: translate, to the base language, a snippet of an electronic file listed in the target-language search results to generate a base-language search results snippet, wherein the output includes at least a portion of the base-language search results snippet; receive user input indicating a level of pertinence of the base-language search results snippet; and determine whether to modify a particular translated query of the multiple translated queries based on the user input.

Clause 102 includes the non-transitory computer-readable medium of any of Clauses 93 to 101, wherein execution of the instructions further causes the one or more processors to: translate, to the base language, a snippet of an electronic file listed in the target-language search results to generate a base-language search results snippet, wherein the output includes at least a portion of the base-language search results snippet; receive user input indicating a level of pertinence of the base-language search results snippet; and generate or update a machine-learning model based on the user input.

Clause 103 includes the non-transitory computer-readable medium of Clause 102, wherein execution of the instructions further causes the one or more processors to, during a subsequent search operation, use the machine-learning model to filter search results, to expand a search query, or both.

Clause 104 includes the non-transitory computer-readable medium of Clause 102 or Clause 103, wherein execution of the instructions further causes the one or more processors to use the machine-learning model to assign label data to one or more electronic files or portions of the one or more electronic files.

Clause 105 includes the non-transitory computer-readable medium of any of Clauses 93 to 104, wherein execution of the instructions further causes the one or more processors to: receive user input indicating a level of pertinence of a particular base-language search result of the base-language search results listing; and based on the user input, schedule a particular electronic file associated with the particular base-language search result for further translation.

Clause 106 includes the non-transitory computer-readable medium of Clause 105, wherein scheduling the particular electronic file for further translation includes assigning a translation task to a speaker of a target language of the particular electronic file.

Clause 107 includes the non-transitory computer-readable medium of any of Clauses 93 to 106, wherein at least one of the one or more sets of electronic files includes text.

Clause 108 includes the non-transitory computer-readable medium of any of Clauses 93 to 107, wherein a particular electronic file of the one or more sets of electronic files includes audio data representing speech in a particular target language, wherein execution of the instructions further causes the one or more processors to: after translating the query to generate a particular translated query in the particular target language, generate an audio signature representing at least a portion of the particular translated query spoken in the particular target language, and wherein the searching the one or more sets of electronic files includes comparing the audio signature to the audio data.

Clause 109 includes the non-transitory computer-readable medium of Clause 108, wherein execution of the instructions further causes the one or more processors to, based on a result of comparing the audio signature to the audio data, schedule generation of a text representation of the particular electronic file.

Clause 110 includes the non-transitory computer-readable medium of Clause 109, wherein scheduling generation of the text representation of the particular electronic file includes updating a work queue of a speech-to-text process.

Clause 111 includes the non-transitory computer-readable medium of Clause 109 or Clause 110, wherein scheduling generation of the text representation of the particular electronic file includes assigning a transcription task to a speaker of the particular target language.

Clause 112 includes a method including: obtaining a query in a base language and a conceptual tag associated with the query; translating the query, based on the conceptual tag, to generate a translated query in a target language, wherein the conceptual tag is indicative of a context relevant to translation of the query; searching a first set of electronic files based on the translated query to generate target-language search results, wherein the first set of electronic files include content in the target language; translating portions of one or more electronic files listed in the target-language search results to the base language to generate a base-language search results listing; and generating an output including at least a portion of the base-language search results listing.

Clause 113 includes the method of Clause 112, further including: receiving input indicating a level of pertinence of a particular base-language search result of the base-language search results listing; and based on the input, scheduling further translation of an electronic file corresponding to the particular base-language search result.

Clause 114 includes the method of Clause 112 or Clause 113, further including saving the query to a persistent query list for use in searching one or more additional electronic files that become available after the searching of the one or more sets of electronic files.

Clause 115 includes the method of any of Clauses 112 to 114, further including saving the translated query to a persistent query list for use in searching one or more additional electronic files that become available after the searching of the one or more sets of electronic files.

Clause 116 includes the method of any of Clauses 112 to 115, further including, before translating the query to generate the translated query, selecting the target language based on configurable query parameters.

Clause 117 includes the method of Clause 116, wherein the configurable query parameters are determined based on a data acquisition requirement.

Clause 118 includes the method of any of Clauses 112 to 117, further including selecting a context-specific dictionary associated with the target language based on the conceptual tag.

Clause 119 includes the method of any of Clauses 112 to 118, wherein the output includes base-language search results snippets based on the translated portions of the one or more electronic files, and further including: receiving user input indicating a level of pertinence of a particular base-language search results snippet; and determining whether to update a translation schedule based on the user input.

Clause 120 includes the method of any of Clauses 112 to 119, wherein the output includes base-language search results snippets based on the translated portions of the one or more electronic files, and further including: receiving user input indicating a level of pertinence of a particular base-language search results snippet; and determining whether to modify the translated query based on the user input.

Clause 121 includes the method of any of Clauses 112 to 120, wherein the output includes base-language search results snippets based on the translated portions of the one or more electronic files, and further including: receiving user input indicating a level of pertinence of a particular base-language search results snippet; and generating or updating a machine-learning model based on the user input.

Clause 122 includes the method of Clause 121, further including, during a subsequent search operation, using the machine-learning model to filter search results, to expand a search query, or both.

Clause 123 includes the method of Clause 121 or Clause 122, further including using the machine-learning model to assign label data one or more electronic files or portions of the one or more electronic files.

Clause 124 includes the method of any of Clauses 112 to 123, further including:

receiving user input indicating a level of pertinence of a particular base-language search result of the base-language search results listing; and based on the user input, scheduling a particular electronic file associated with the particular base-language search result for further translation.

Clause 125 includes the method of Clause 124, wherein scheduling the particular electronic file for further translation includes assigning a translation task to a speaker of the target language.

Clause 126 includes the method of any of Clauses 112 to 125, wherein at least one of the one or more sets of electronic files includes text.

Clause 127 includes the method of any of Clauses 112 to 126, wherein a particular electronic file of the first set of electronic files includes audio data representing speech in the target language, the method further including: after translating the query to generate the translated query, generating an audio signature representing at least a portion of the translated query spoken in the target language, and wherein the searching the first sets of electronic files includes comparing the audio signature to the audio data.

Clause 128 includes the method of Clause 127, further including, based on a result of comparing the audio signature to the audio data, scheduling generation of a text representation of the particular electronic file.

Clause 129 includes the method of Clause 128, wherein scheduling generation of the text representation of the particular electronic file includes updating a work queue of a speech-to-text process.

Clause 130 includes the method of Clause 128 or Clause 129, wherein scheduling generation of the text representation of the particular electronic file includes assigning a transcription task to a speaker of the target language.

Clause 131 includes the method of any of Clauses 112 to 130, further including: obtaining a second conceptual tag associated with the query; translating the query, based on the second conceptual tag, to generate a second translated query in the target language, wherein the second conceptual tag is indicative of a second context relevant to translation of the query, and wherein the second translated query is different from the translated query; and searching the first set of electronic files based on the second translated query to generate the target-language search results.

Clause 132 includes the method of any of Clauses 112 to 131, further including: obtaining a second conceptual tag associated with the query; translating the query, based on the second conceptual tag, to generate a second translated query in the target language, wherein the second conceptual tag is indicative of a second context relevant to translation of the query, and wherein the second translated query is different from the translated query; and searching a second set of electronic files based on the second translated query to generate the target-language search results.

Clause 133 includes the method of any of Clauses 112 to 132, further including: obtaining a second conceptual tag associated with the query; and based on the second conceptual tag, searching a second set of electronic files based on the translated query.

Clause 134 includes a device including: one or more processors configured to: obtain a query in a base language and a conceptual tag associated with the query; translate the query, based on the conceptual tag, to generate a translated query in a target language, wherein the conceptual tag is indicative of a context relevant to translation of the query; search a first set of electronic files based on the translated query to generate target-language search results, wherein the first set of electronic files include content in the target language; translate portions of one or more electronic files listed in the target-language search results to the base language to generate a base-language search results listing; and generate an output including at least a portion of the base-language search results listing.

Clause 135 includes the device of Clause 134, wherein the one or more processors are further configured to: receive input indicating a level of pertinence of a particular base-language search result of the base-language search results listing; and based on the input, schedule further translation of an electronic file corresponding to the particular base-language search result.

Clause 136 includes the device of Clause 134 or Clause 135, wherein the one or more processors are further configured to save the query to a persistent query list for use in searching one or more additional electronic files that become available after the searching of the one or more sets of electronic files.

Clause 137 includes the device of any of Clauses 134 to 136, wherein the one or more processors are further configured to save the translated query to a persistent query list for use in searching one or more additional electronic files that become available after the searching of the one or more sets of electronic files.

Clause 138 includes the device of any of Clauses 134 to 137, wherein the one or more processors are further configured to, before translating the query to generate the translated query, select the target language based on configurable query parameters.

Clause 139 includes the device of Clause 138, wherein the configurable query parameters are determined based on a data acquisition requirement.

Clause 140 includes the device of any of Clauses 134 to 139, wherein the one or more processors are further configured to select a context-specific dictionary associated with the target language based on the conceptual tag.

Clause 141 includes the device of any of Clauses 134 to 140, wherein the output includes base-language search results snippets based on the translated portions of the one or more electronic files, and wherein the one or more processors are further configured to: receive user input indicating a level of pertinence of a particular base-language search results snippet; and determine whether to update a translation schedule based on the user input.

Clause 142 includes the device of any of Clauses 134 to 141, wherein the output includes base-language search results snippets based on the translated portions of the one or more electronic files, and wherein the one or more processors are further configured to: receive user input indicating a level of pertinence of a particular base-language search results snippet; and determine whether to modify the translated query based on the user input.

Clause 143 includes the device of any of Clauses 134 to 142, wherein the output includes base-language search results snippets based on the translated portions of the one or more electronic files, and wherein the one or more processors are further configured to: receive user input indicating a level of pertinence of a particular base-language search results snippet; and generate or update a machine-learning model based on the user input.

Clause 144 includes the device of Clause 143, wherein the one or more processors are further configured to, during a subsequent search operation, use the machine-learning model to filter search results, to expand a search query, or both.

Clause 145 includes the device of Clause 143 or Clause 144, wherein the one or more processors are further configured to use the machine-learning model to assign label data one or more electronic files or portions of the one or more electronic files.

Clause 146 includes the device of any of Clauses 134 to 145, wherein the one or more processors are further configured to: receive user input indicating a level of pertinence of a particular base-language search result of the base-language search results listing; and based on the user input, schedule a particular electronic file associated with the particular base-language search result for further translation.

Clause 147 includes the device of Clause 146, wherein scheduling the particular electronic file for further translation includes assigning a translation task to a speaker of the target language.

Clause 148 includes the device of any of Clauses 134 to 147, wherein at least one of the one or more sets of electronic files includes text.

Clause 149 includes the device of any of Clauses 134 to 148, wherein a particular electronic file of the first set of electronic files includes audio data representing speech in the target language, wherein the one or more processors are further configured to: after translating the query to generate the translated query, generate an audio signature representing at least a portion of the translated query spoken in the target language, and wherein the searching the first sets of electronic files includes comparing the audio signature to the audio data.

Clause 150 includes the device of Clause 149, wherein the one or more processors are further configured to, based on a result of comparing the audio signature to the audio data, schedule generation of a text representation of the particular electronic file.

Clause 151 includes the device of Clause 150, wherein scheduling generation of the text representation of the particular electronic file includes updating a work queue of a speech-to-text process.

Clause 152 includes the device of Clause 150 or Clause 151, wherein scheduling generation of the text representation of the particular electronic file includes assigning a transcription task to a speaker of the target language.

Clause 153 includes the device of any of Clauses 134 to 152, wherein the one or more processors are further configured to: obtain a second conceptual tag associated with the query; translate the query, based on the second conceptual tag, to generate a second translated query in the target language, wherein the second conceptual tag is indicative of a second context relevant to translation of the query, and wherein the second translated query is different from the translated query; and search the first set of electronic files based on the second translated query to generate the target-language search results.

Clause 154 includes the device of any of Clauses 134 to 153, wherein the one or more processors are further configured to: obtain a second conceptual tag associated with the query; translate the query, based on the second conceptual tag, to generate a second translated query in the target language, wherein the second conceptual tag is indicative of a second context relevant to translation of the query, and wherein the second translated query is different from the translated query; and search a second set of electronic files based on the second translated query to generate the target-language search results.

Clause 155 includes the device of any of Clauses 134 to 154, wherein the one or more processors are further configured to: obtain a second conceptual tag associated with the query; and based on the second conceptual tag, search a second set of electronic files based on the translated query.

Clause 156 includes a non-transitory computer-readable medium storing instructions that, when executed by one or more processors, cause the one or more processors to: obtain a query in a base language and a conceptual tag associated with the query; translate the query, based on the conceptual tag, to generate a translated query in a target language, wherein the conceptual tag is indicative of a context relevant to translation of the query; search a first set of electronic files based on the translated query to generate target-language search results, wherein the first set of electronic files include content in the target language; translate portions of one or more electronic files listed in the target-language search results to the base language to generate a base-language search results listing; and generate an output including at least a portion of the base-language search results listing.

Clause 157 includes the non-transitory computer-readable medium of Clause 156, wherein execution of the instructions further causes the one or more processors to: receive input indicating a level of pertinence of a particular base-language search result of the base-language search results listing; and based on the input, schedule further translation of an electronic file corresponding to the particular base-language search result.

Clause 158 includes the non-transitory computer-readable medium of Clause 156 or Clause 157, wherein execution of the instructions further causes the one or more processors to save the query to a persistent query list for use in searching one or more additional electronic files that become available after the searching of the one or more sets of electronic files.

Clause 159 includes the non-transitory computer-readable medium of any of Clauses 156 to 158, wherein execution of the instructions further causes the one or more processors to save the translated query to a persistent query list for use in searching one or more additional electronic files that become available after the searching of the one or more sets of electronic files.

Clause 160 includes the non-transitory computer-readable medium of any of Clauses 156 to 159, wherein execution of the instructions further causes the one or more processors to, before translating the query to generate the translated query, select the target language based on configurable query parameters.

Clause 161 includes the non-transitory computer-readable medium of Clause 160, wherein the configurable query parameters are determined based on a data acquisition requirement.

Clause 162 includes the non-transitory computer-readable medium of any of Clauses 156 to 161, wherein execution of the instructions further causes the one or more processors to select a context-specific dictionary associated with the target language based on the conceptual tag.

Clause 163 includes the non-transitory computer-readable medium of any of Clauses 156 to 162, wherein the output includes base-language search results snippets based on the translated portions of the one or more electronic files, and wherein execution of the instructions further causes the one or more processors to: receive user input indicating a level of pertinence of a particular base-language search results snippet; and determine whether to update a translation schedule based on the user input.

Clause 164 includes the non-transitory computer-readable medium of any of Clauses 156 to 163, wherein the output includes base-language search results snippets based on the translated portions of the one or more electronic files, and wherein execution of the instructions further causes the one or more processors to: receive user input indicating a level of pertinence of a particular base-language search results snippet; and determine whether to modify the translated query based on the user input.

Clause 165 includes the non-transitory computer-readable medium of any of Clauses 156 to 164, wherein the output includes base-language search results snippets based on the translated portions of the one or more electronic files, and wherein execution of the instructions further causes the one or more processors to: receive user input indicating a level of pertinence of a particular base-language search results snippet; and generate or update a machine-learning model based on the user input.

Clause 166 includes the non-transitory computer-readable medium of Clause 165, wherein execution of the instructions further causes the one or more processors to, during a subsequent search operation, use the machine-learning model to filter search results, to expand a search query, or both.

Clause 167 includes the non-transitory computer-readable medium of Clause 165 or Clause 166, wherein execution of the instructions further causes the one or more processors to use the machine-learning model to assign label data one or more electronic files or portions of the one or more electronic files.

Clause 168 includes the non-transitory computer-readable medium of any of Clauses 156 to 167, wherein execution of the instructions further causes the one or more processors to: receive user input indicating a level of pertinence of a particular base-language search result of the base-language search results listing; and based on the user input, schedule a particular electronic file associated with the particular base-language search result for further translation.

Clause 169 includes the non-transitory computer-readable medium of Clause 168, wherein scheduling the particular electronic file for further translation includes assigning a translation task to a speaker of the target language.

Clause 170 includes the non-transitory computer-readable medium of any of Clauses 156 to 169, wherein at least one of the one or more sets of electronic files includes text.

Clause 171 includes the non-transitory computer-readable medium of any of Clauses 156 to 170, wherein a particular electronic file of the first set of electronic files includes audio data representing speech in the target language wherein execution of the instructions further causes the one or more processors to: after translating the query to generate the translated query, generate an audio signature representing at least a portion of the translated query spoken in the target language, and wherein the searching the first sets of electronic files includes comparing the audio signature to the audio data.

Clause 172 includes the non-transitory computer-readable medium of Clause 171, wherein execution of the instructions further causes the one or more processors to, based on a result of comparing the audio signature to the audio data, schedule generation of a text representation of the particular electronic file.

Clause 173 includes the non-transitory computer-readable medium of Clause 172, wherein scheduling generation of the text representation of the particular electronic file includes updating a work queue of a speech-to-text process.

Clause 174 includes the non-transitory computer-readable medium of Clause 172 or Clause 173, wherein scheduling generation of the text representation of the particular electronic file includes assigning a transcription task to a speaker of the target language.

Clause 175 includes the non-transitory computer-readable medium of any of Clauses 156 to 174, wherein execution of the instructions further causes the one or more processors to: obtain a second conceptual tag associated with the query; translate the query, based on the second conceptual tag, to generate a second translated query in the target language, wherein the second conceptual tag is indicative of a second context relevant to translation of the query, and wherein the second translated query is different from the translated query; and search the first set of electronic files based on the second translated query to generate the target-language search results.

Clause 176 includes the non-transitory computer-readable medium of any of Clauses 156 to 175, wherein execution of the instructions further causes the one or more processors to: obtain a second conceptual tag associated with the query; translate the query, based on the second conceptual tag, to generate a second translated query in the target language, wherein the second conceptual tag is indicative of a second context relevant to translation of the query, and wherein the second translated query is different from the translated query; and search a second set of electronic files based on the second translated query to generate the target-language search results.

Clause 177 includes the non-transitory computer-readable medium of any of Clauses 156 to 176, wherein execution of the instructions further causes the one or more processors to: obtain a second conceptual tag associated with the query; and based on the second conceptual tag, search a second set of electronic files based on the translated query.

Although the disclosure may include a method, it is contemplated that it may be embodied as computer program instructions on a tangible computer-readable medium, such as a magnetic or optical memory or a magnetic or optical disk/disc. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

Changes and modifications may be made to the disclosed embodiments without departing from the scope of the present disclosure. These and other changes or modifications are intended to be included within the scope of the present disclosure, as expressed in the following claims.

What is claimed is:

1. A device comprising:
one or more processors configured to:
obtain a query in a base language and a conceptual tag associated with the query;
translate the query, based on the conceptual tag, to generate a translated query in a target language, wherein the conceptual tag is indicative of a context relevant to translation of the query, wherein the query is translated using a first context-specific dictionary responsive to the conceptual tag being a first particular conceptual tag, and wherein the query is translated using a second context-specific dictionary distinct from the first context-specific dictionary responsive to the conceptual tag being a second particular conceptual tag distinct from the first particular conceptual tag;
search a first set of electronic files based on the translated query to generate target-language search results, wherein the first set of electronic files include content in the target language;
translate portions of one or more electronic files listed in the target-language search results to the base language to generate a base-language search results listing; and
generate an output including at least a portion of the base-language search results listing.

2. The device of claim 1, wherein the one or more processors are further configured to:
receive input indicating a level of pertinence of a particular base-language search result of the base-language search results listing; and
based on the input, schedule further translation of an electronic file corresponding to the particular base-language search result.

3. The device of claim 1, wherein the one or more processors are further configured to save the query, translated query, or both, to a persistent query list for use in searching one or more additional electronic files that become available after the searching of the one or more sets of electronic files.

4. The device of claim 1, wherein the one or more processors are further configured to, before translating the query to generate the translated query, select the target language based on configurable query parameters that are based on a data acquisition requirement.

5. The device of claim 1, wherein the output includes base-language search results snippets based on the translated portions of the one or more electronic files, and wherein the one or more processors are further configured to:
receive user input indicating a level of pertinence of a particular base-language search results snippet; and
determine whether to update a translation schedule based on the user input.

6. The device of claim 1, wherein the output includes base-language search results snippets based on the translated portions of the one or more electronic files, and wherein the one or more processors are further configured to:
receive user input indicating a level of pertinence of a particular base-language search results snippet; and
determine whether to modify the translated query based on the user input.

7. The device of claim 1, wherein the output includes base-language search results snippets based on the translated portions of the one or more electronic files, and wherein the one or more processors are further configured to:
receive user input indicating a level of pertinence of a particular base-language search results snippet;
generate or update a machine-learning model based on the user input; and
use the machine-learning model to filter search results, to expand a search query, to assign label data to the one or more electronic files or portions of the one or more electronic files, or a combination thereof.

8. The device of claim 1, wherein a particular electronic file of the first set of electronic files includes audio data representing speech in the target language, wherein the one or more processors are further configured to:
after translating the query to generate the translated query, generate an audio signature representing at least a portion of the translated query spoken in the target language, and wherein searching the first sets of electronic files includes comparing the audio signature to the audio data.

9. The device of claim 1, wherein the one or more processors are further configured to:
obtain a second conceptual tag associated with the query;
translate the query, based on the second conceptual tag, to generate a second translated query in the target language, wherein the second conceptual tag is indicative of a second context relevant to translation of the query, and wherein the second translated query is different from the translated query; and
search at least one of the first set of electronic files or a second set of electronic files based on the second translated query to generate the target-language search results.

10. The device of claim 1, wherein the one or more processors are further configured to:
obtain a second conceptual tag associated with the query; and
based on the second conceptual tag, search a second set of electronic files based on the translated query.

11. A method comprising:
obtaining a query in a base language and a conceptual tag associated with the query;
translating the query, based on the conceptual tag, to generate a translated query in a target language, wherein the conceptual tag is indicative of a context relevant to translation of the query, wherein the query is translated using a first context-specific dictionary responsive to the conceptual tag being a first particular conceptual tag, and wherein the query is translated using a second context-specific dictionary distinct from the first context-specific dictionary responsive to the conceptual tag being a second particular conceptual tag distinct from the first particular conceptual tag;
searching a first set of electronic files based on the translated query to generate target-language search results, wherein the first set of electronic files includes content in the target language;
translating portions of one or more electronic files listed in the target-language search results to the base language to generate a base-language search results listing; and
generating an output including at least a portion of the base-language search results listing.

12. The method of claim 11, further comprising:
receiving input indicating a level of pertinence of a particular base-language search result of the base-language search results listing; and based on the input, scheduling further translation of an electronic file corresponding to the particular base-language search result.

13. The method of claim 11, further comprising saving the query to a persistent query list for use in searching one or more additional electronic files that become available after the searching of the one or more sets of electronic files.

14. The method of claim 11, further comprising saving the translated query to a persistent query list for use in searching one or more additional electronic files that become available after the searching of the one or more sets of electronic files.

15. The method of claim 11, wherein the output includes base-language search results snippets based on the translated portions of the one or more electronic files, and further comprising:
   receiving user input indicating a level of pertinence of a particular base-language search results snippet;
   generating or updating a machine-learning model based on the user input; and
   using the machine-learning model to filter search results, to expand a search query, or to assign label data to the one or more electronic files or portions of the one or more electronic files, or a combination thereof.

16. The method of claim 11, further comprising:
   obtaining a second conceptual tag associated with the query;
   translating the query, based on the second conceptual tag, to generate a second translated query in the target language, wherein the second conceptual tag is indicative of a second context relevant to translation of the query, and wherein the second translated query is different from the translated query; and
   searching at least one of the first set of electronic files or a second set of electronic files based on the second translated query to generate the target-language search results.

17. A non-transitory computer-readable medium storing instructions that, when executed by one or more processors, cause the one or more processors to:
   obtain a query in a base language and a conceptual tag associated with the query;
   translate the query, based on the conceptual tag, to generate a translated query in a target language, wherein the conceptual tag is indicative of a context relevant to translation of the query, wherein the query is translated using a first context-specific dictionary responsive to the conceptual tag being a first particular conceptual tag, and wherein the query is translated using a second context-specific dictionary distinct from the first context-specific dictionary responsive to the conceptual tag being a second particular conceptual tag distinct from the first particular conceptual tag;
   search a first set of electronic files based on the translated query to generate target-language search results, wherein the first set of electronic files include content in the target language;
   translate portions of one or more electronic files listed in the target-language search results to the base language to generate a base-language search results listing; and
   generate an output including at least a portion of the base-language search results listing.

18. The non-transitory computer-readable medium of claim 17, wherein execution of the instructions further causes the one or more processors to:
   receive input indicating a level of pertinence of a particular base-language search result of the base-language search results listing; and
   based on the input, schedule further translation of an electronic file corresponding to the particular base-language search result.

19. The non-transitory computer-readable medium of claim 17, wherein the output includes base-language search results snippets based on the translated portions of the one or more electronic files, and wherein execution of the instructions further causes the one or more processors to:
   receive user input indicating a level of pertinence of a particular base-language search results snippet; and
   generate or update a machine-learning model based on the user input.

20. The non-transitory computer-readable medium of claim 17, wherein execution of the instructions further causes the one or more processors to:
   obtain a second conceptual tag associated with the query;
   translate the query, based on the second conceptual tag, to generate a second translated query in the target language, wherein the second conceptual tag is indicative of a second context relevant to translation of the query, and wherein the second translated query is different from the translated query; and
   search at least one of the first set of electronic files or a second set of electronic files based on the second translated query to generate the target-language search results.

* * * * *